US008533349B2

(12) United States Patent
Hegli et al.

(10) Patent No.: US 8,533,349 B2
(45) Date of Patent: Sep. 10, 2013

(54) SYSTEM AND METHOD FOR CONTROLLING ACCESS TO INTERNET SITES

(75) Inventors: Ronald Hegli, San Diego, CA (US); John Carrington, Newport Coast, CA (US); David Oei, San Diego, CA (US)

(73) Assignee: Websense, Inc., San Diego, CA (US)

( * ) Notice: Subject to any disclaimer, the term of this patent is extended or adjusted under 35 U.S.C. 154(b) by 1915 days.

(21) Appl. No.: 10/616,420

(22) Filed: Jul. 8, 2003

(65) Prior Publication Data
US 2004/0015586 A1 Jan. 22, 2004

Related U.S. Application Data

(63) Continuation of application No. 09/494,315, filed on Jan. 28, 2000, now Pat. No. 6,606,659.

(51) Int. Cl.
*G06F 15/16* (2006.01)
(52) U.S. Cl.
USPC .............................................. 709/229; 726/4
(58) Field of Classification Search
USPC ............................................ 709/229; 726/4
See application file for complete search history.

(56) References Cited

U.S. PATENT DOCUMENTS

| | | | |
|---|---|---|---|
| 4,423,414 A | 12/1983 | Bryant et al. | |
| 4,941,084 A | 7/1990 | Terada et al. | |
| 5,493,692 A | 2/1996 | Theimer et al. | |
| 5,541,911 A | 7/1996 | Nilakantan et al. | |
| 5,548,729 A | 8/1996 | Akiyoshi et al. | |
| 5,555,376 A | 9/1996 | Theimer et al. | |
| 5,581,703 A | 12/1996 | Baugher et al. | |
| 5,606,668 A | 2/1997 | Shwed | |
| 5,678,041 A | 10/1997 | Baker et al. | |
| 5,682,325 A | 10/1997 | Lightfoot et al. | |
| 5,696,486 A | 12/1997 | Poliquin et al. | |
| 5,696,898 A | 12/1997 | Baker et al. | |
| 5,706,507 A | 1/1998 | Schloss | |

(Continued)

FOREIGN PATENT DOCUMENTS

| | | |
|---|---|---|
| EP | 0 658 837 A2 | 12/1994 |
| EP | 1 280 040 | 1/2003 |

(Continued)

OTHER PUBLICATIONS

Shigechika Aikawa, Q & A Collection, DOS/V Power Report, Japan, Impress Inc., May 1, 1998, vol. 8 No. 5, p. 358-361.

(Continued)

*Primary Examiner* — Douglas Blair
(74) *Attorney, Agent, or Firm* — Knobbe Martens Olson & Bear LLP

(57) ABSTRACT

A method and system for providing flexible access to Internet sites is described. The system includes a database of Internet sites that have been categorized so that the system determines the category of information that a user is accessing on the Internet. The system is also programmed so users are only allowed to access sites within a particular category a limited number of times. Moreover, users can requested a postponed access, wherein the site they are requesting is stored to a server, and available to the user at a later time. In addition, if a user chooses to access a site that is within certain predefined categories, they are presented with the option of retrieving the page, but notified that their access will be logged to a file.

12 Claims, 13 Drawing Sheets

(56) References Cited

U.S. PATENT DOCUMENTS

| | | | |
|---|---|---|---|
| 5,720,033 A | 2/1998 | Deo | |
| 5,742,759 A | 4/1998 | Nessett et al. | |
| 5,758,257 A | 5/1998 | Herz et al. | |
| 5,774,668 A | 6/1998 | Choquier et al. | |
| 5,787,253 A | 7/1998 | McCreery et al. | |
| 5,787,427 A | 7/1998 | Benantar et al. | |
| 5,799,002 A | 8/1998 | Krishnan | |
| 5,801,747 A * | 9/1998 | Bedard | 725/46 |
| 5,828,833 A | 10/1998 | Belville et al. | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,884,325 A | 3/1999 | Bauer et al. | |
| 5,889,958 A * | 3/1999 | Willens | 709/229 |
| 5,892,905 A | 4/1999 | Brandt et al. | |
| 5,893,086 A | 4/1999 | Schmuck et al. | |
| 5,896,502 A | 4/1999 | Shieh et al. | |
| 5,898,830 A | 4/1999 | Wesinger et al. | |
| 5,899,995 A | 5/1999 | Millier et al. | |
| 5,911,043 A | 6/1999 | Duffy et al. | |
| 5,933,827 A * | 8/1999 | Cole et al. | 1/1 |
| 5,937,404 A | 8/1999 | Csaszar et al. | |
| 5,941,947 A | 8/1999 | Brown et al. | |
| 5,944,794 A | 8/1999 | Okamoto et al. | |
| 5,956,734 A | 9/1999 | Schmuck et al. | |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,611 A * | 11/1999 | Freund | 726/4 |
| 5,991,807 A | 11/1999 | Schmidt et al. | |
| 5,996,011 A | 11/1999 | Humes | |
| 5,999,929 A | 12/1999 | Goodman | |
| 6,052,723 A | 4/2000 | Ginn | |
| 6,052,730 A | 4/2000 | Felciano et al. | |
| 6,055,564 A | 4/2000 | Phaal | |
| 6,065,056 A | 5/2000 | Bradshaw et al. | |
| 6,065,059 A | 5/2000 | Shieh et al. | |
| 6,073,239 A | 6/2000 | Dotan | |
| 6,078,913 A * | 6/2000 | Aoki et al. | 1/1 |
| 6,085,241 A | 7/2000 | Otis | |
| 6,105,027 A | 8/2000 | Schneider et al. | |
| 6,154,741 A | 11/2000 | Feldman | |
| 6,173,364 B1 | 1/2001 | Zenchelsky et al. | |
| 6,178,419 B1 * | 1/2001 | Legh-Smith et al. | 1/1 |
| 6,182,118 B1 | 1/2001 | Finney et al. | |
| 6,219,667 B1 | 4/2001 | Lu et al. | |
| 6,233,618 B1 | 5/2001 | Shannon | |
| 6,233,686 B1 | 5/2001 | Zenchelsky et al. | |
| 6,253,188 B1 | 6/2001 | Witek et al. | |
| 6,256,739 B1 * | 7/2001 | Skopp et al. | 726/2 |
| 6,266,664 B1 | 7/2001 | Russell-Falla et al. | |
| 6,295,559 B1 | 9/2001 | Emens et al. | |
| 6,338,088 B1 | 1/2002 | Waters et al. | |
| 6,357,010 B1 | 3/2002 | Viets et al. | |
| 6,418,433 B1 | 7/2002 | Chakrabarti et al. | |
| 6,434,662 B1 | 8/2002 | Greene et al. | |
| 6,446,119 B1 | 9/2002 | Olah et al. | |
| 6,456,306 B1 | 9/2002 | Chin et al. | |
| 6,460,141 B1 | 10/2002 | Olden | |
| 6,466,940 B1 | 10/2002 | Mills | |
| 6,486,892 B1 * | 11/2002 | Stern | 715/760 |
| 6,505,201 B1 * | 1/2003 | Haitsuka et al. | 707/10 |
| 6,519,571 B1 | 2/2003 | Guheen et al. | |
| 6,567,800 B1 * | 5/2003 | Barrera et al. | 1/1 |
| 6,606,659 B1 | 8/2003 | Hegli et al. | |
| 6,741,997 B1 | 5/2004 | Liu et al. | |
| 6,769,009 B1 * | 7/2004 | Reisman | 709/201 |
| 6,807,558 B1 | 10/2004 | Hassett et al. | |
| 6,832,230 B1 | 12/2004 | Zilliacus et al. | |
| 6,839,680 B1 * | 1/2005 | Liu et al. | 705/10 |
| 6,894,991 B2 | 5/2005 | Ayyagari et al. | |
| 6,907,425 B1 * | 6/2005 | Barrera et al. | 1/1 |
| 6,947,935 B1 | 9/2005 | Horvitz et al. | |
| 6,947,985 B2 | 9/2005 | Hegli et al. | |
| 6,978,292 B1 | 12/2005 | Murakami et al. | |
| 7,003,442 B1 * | 2/2006 | Tsuda | 704/9 |
| 7,185,361 B1 | 2/2007 | Ashoff et al. | |
| 7,197,713 B2 * | 3/2007 | Stern | 715/745 |
| 7,370,365 B2 * | 5/2008 | Carroll et al. | 726/28 |
| 7,389,532 B2 * | 6/2008 | Swander | 726/11 |
| 7,603,685 B2 * | 10/2009 | Knudson et al. | 725/46 |
| 7,603,687 B2 * | 10/2009 | Pietraszak et al. | 725/50 |
| 7,690,013 B1 * | 3/2010 | Eldering et al. | 725/36 |
| 2001/0032258 A1 | 10/2001 | Ishida et al. | |
| 2001/0039582 A1 | 11/2001 | McKinnon et al. | |
| 2002/0049883 A1 | 4/2002 | Schneider et al. | |
| 2002/0073089 A1 | 6/2002 | Schwartz et al. | |
| 2002/0099952 A1 | 7/2002 | Lambert | |
| 2002/0129039 A1 | 9/2002 | Majewski et al. | |
| 2002/0133509 A1 | 9/2002 | Johnston et al. | |
| 2002/0152284 A1 | 10/2002 | Cambray et al. | |
| 2003/0005112 A1 | 1/2003 | Krautkremer | |
| 2003/0023860 A1 | 1/2003 | Eatough et al. | |
| 2003/0074567 A1 | 4/2003 | Charbonneau | |
| 2003/0126136 A1 | 7/2003 | Omoigui | |
| 2003/0126139 A1 | 7/2003 | Lee et al. | |
| 2003/0177187 A1 | 9/2003 | Levine et al. | |
| 2004/0019656 A1 | 1/2004 | Smith | |
| 2004/0068479 A1 | 4/2004 | Wolfson et al. | |
| 2004/0078591 A1 | 4/2004 | Teixeira et al. | |
| 2004/0111499 A1 | 6/2004 | Dobrowski et al. | |
| 2004/0167931 A1 * | 8/2004 | Han | 707/104.1 |
| 2004/0220924 A1 | 11/2004 | Wootton | |
| 2005/0155012 A1 | 7/2005 | Tayama et al. | |

FOREIGN PATENT DOCUMENTS

| | | |
|---|---|---|
| EP | 1 638 016 | 3/2006 |
| JP | 11-219363 | 8/1999 |
| JP | 2000 235540 A | 8/2000 |
| WO | WO 92/19054 | 10/1992 |
| WO | WO 96/05549 A1 | 2/1996 |
| WO | WO 96/42041 | 12/1996 |
| WO | WO 98/28690 | 7/1998 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 2005/010692 | 2/2005 |
| WO | WO 2005/074213 | 8/2005 |
| WO | WO 2006/027590 | 3/2006 |

OTHER PUBLICATIONS

European Search Report for Application No. 02258462.7, mailed Jan. 30, 2006.
Supplementary European Search Report for EPO App. No. 00 90 7078, mailed May 18, 2004.
Roberts-Witt, S., The 1999 Utility Guide: Corporate Filtering, PC Magazine Online, Apr. 5, 1999, pp. 1-11.
Sequel Technology, Inc., Sequel and Surfwatch Partner to Provide Innovative Internet Resource Management Tools for Large Enterprises, Internet, Online!, Feb. 25, 1999, pp. 1-3.
SurfWatch Software, SurfWatch® Professional Edition: Product Overview, Internet, Online!, May 26, 1999, p. 1.
Newman, H., A Look at Some Popular Filtering Systems, Internet, Online!, Jul. 25, 1999, pp. 1-11.
Secure Computing Corporation, SmartFilter™ Web Tool, Dec. 1, 1998, pp. 1-2.
Sandhu, et al., Access Control: Principles and Practice, IEEE Communications Magazine, pp. 40-48, Sep. 1994.
C. L. Schuba and E. H. Spafford. Countering abuse of name-based authentication. In 22nd Annual Telecommunications Policy Research Conference, 21 pp., 1996.
SurfControl plc, SuperScout Web Filter Reviewer's Guide, 36 pp., 2002.

Yialelis, et al., Role-Based Security for Distributed Object Systems, Proceedings of the IEEE Fifty Workshops on Enabling Technology: Infrastructure for Collaborative Enterprises (WET ICE '96), 6 pp., Jun. 19-21, 1996.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

Greenfield, P., et al., Access Prevention Techniques for Internet Content Filtering, CSIRO (XP002265027), Dec. 1999.

IBM Corp., Enforced Separation of Roles in a Multi-User Operating System, IBM Technical Disclosure Bulletin, Dec. 1991, Issue 34, pp. 120-122.

IBM Technical Disclosure Bulletin, Mean to Protect System from Virus, IBM Corp., Aug. 1, 1994, Issue 659-660.

Reid, Open Systems Security: Traps and Pitfalls, Computer & Security, 1995, Issue 14, pp. 496-517.

Stein, Web Security—a step by step reference guide, Addison-Wesley, 1997, pp. 387-415.

Williams, R., Data Integrity with Veracity, Retrieved from the Internet: <URL: ftp://ftp.rocksoft.com/clients/rocksoft/papers/vercty10.ps>, Sep. 12, 1994.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23-27, 2006, pp. 1166-1171.

Gittler F., et al., The DCE Security Service, Pub: Hewlett-Packard Journal, Dec. 1995, pp. 41-48.

Deal et al., Prescription for data security, Nikkei Bite, Nikkei BP Inc., Oct. 1, 1991, vol. 91, pp. 351-369, Japan.

Ohuchi, Access control for protecting an important data from destruction and manipulation, Nikkei Computer, Nikkei Magurouhiru Inc., Feb. 3, 1986, vol. 141, pp. 75-80, Japan.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Takizawa, Utility of a filtering tool 'Gate Guard' of Internet, Nikkei Communication, Nikkei BP Inc., Oct. 20, 1997, vol. 256, pp. 136-139, Japan.

* cited by examiner

WORD ID TABLE 200

| WORD | ID NUMBER |
|---|---|
| THE | 1 |
| AND | 2 |
| CLEVELAND | 234 |
| BROWNS | 198 |
| DIAMOND | 755 |
| JEWELRY | 1345 |

CATEGORY ID TABLE 205

| CATEGORY | ALPHA SCORE | BETA SCORE | DESCRIPTION |
|---|---|---|---|
| 1 | 920 | 810 | SPORTS |
| 2 | 860 | 705 | SEX |
| 3 | 880 | 740 | SHOPPING |
| 4 | 710 | 630 | PORNOGRAPHY |
| 5 | 940 | 865 | LEISURE |
| 6 | 860 | 690 | RELIGION |

WORD RELEVANCE TABLE 210

| FIRST WORD ID | SECOND WORD ID | CATEGORY | RELEVANCE SCORE | PAIR | ADJACENT |
|---|---|---|---|---|---|
| 234 | 198 | 1 | 900 | N | Y |
| 755 | 1345 | 1 | 290 | N | Y |
| 755 | 1345 | 3 | 940 | Y | N |
| 234 | 1345 | 1 | 250 | N | Y |

TRAINING DATABASE

SYSTEM AND METHOD FOR CONTROLLING ACCESS TO INTERNET SITES

RELATED APPLICATIONS

This application is a continuation, under 37 C.F.R. §1.53 (b), of U.S. application Ser. No. 09/494,315, entitled "SYSTEM AND METHOD FOR CONTROLLING ACCESS TO INTERNET SITES", filed on Jan. 28, 2000 now U.S. Pat. No. 6,606,659.

BACKGROUND OF THE INVENTION

1. Field of the Invention

This invention relates to systems and methods for selectively blocking access to particular Internet websites and pages. More specifically, embodiments of this invention relate to a flexible filtering system and method that provides administrators with several options for controlling end-user access to those sites.

2. Description of the Related Art

The Internet is a global system of computers that are linked together so that the various computers can communicate seamlessly with one another. Internet users access server computers in order to download and display informational pages. Once a server has been connected to the Internet, its informational pages can be displayed by virtually anyone having access to the Internet.

The easy access and inexpensive cost of retrieving Internet pages has led to several problems for controlling access to inappropriate information, such as pornography. Several solutions to this problem have been proposed, including rating systems similar to that used for rating movies so that a parent or employer could control access to Internet servers, or pages, that have a particular rating. Unfortunately, this mechanism requires each person running an Internet server to voluntarily rate their site. Because of the free-wheeling nature of the Internet, this type of voluntary rating scheme is unlikely to be very efficient for preventing access to sites, such as those containing pornography, that most parents or businesses desire to block.

In addition to a rating scheme, others have developed databases that contain the uniform resource locater (URL) address of sites to be blocked. These databases are integrated into network computer systems and Internet firewalls so that a person wishing access to the Internet first has their URL request matched against the database of blocked sites. Any URL found in the database cannot be accessed by the user. One such system is described in U.S. Pat. No. 5,678,041 to Baker et al. Unfortunately, such systems rely on the database of accessed sites to be complete. Because new servers are being added to the Internet on a daily basis, as well as current servers being updated with new information, these databases do not provide a complete list of sites that should be blocked.

In addition, current systems do not provide a user with any flexibility once they have requested a site that is within the blocked database. Thus, users that have a legitimate reason for reviewing such sites are still denied access.

Thus, what is needed in the art is a flexible system that provides control over which sites can be retrieved, but also has the flexibility to provide access to blocked sites under specific conditions. The present invention provides such a system.

SUMMARY OF THE INVENTION

One embodiment of the invention is a system for controlling user access to categories of Internet sites that includes: a categorized database of Internet sites; a first module for referencing said categorized database and determining the category of Internet site that is accessed by a user; and a second module for determining whether a user has spent a preset amount of time on an Internet site within said category and, responsive to said determination, blocking the user's further access to the site.

Another embodiment of the invention includes a system for providing postponed access to specific sites on the Internet. This embodiment includes: a categorized database of Internet sites; a first module for referencing said categorized database and determining the category of Internet site that is accessed by a user; and a second module comprising instructions for determining whether a user requests a postponed access to an Internet site within said category, and responsive to said determination, storing pages from the requested the Internet site to a storage.

Yet another embodiment is a system for controlling access to categories of Internet sites that provides: a categorized database of Internet sites; a first module for referencing said categorized database and determining the category of Internet site that is accessed by a user; and a second module for determining whether a user has accessed an Internet site within said category a predetermined number of times and, responsive to said determination, blocking the user's further access to the site.

Still another embodiment is a system for controlling access to Internet sites, comprising: a categorized database of Internet sites; a first module for referencing said categorized database and determining the category of Internet site that is accessed by a user; and a second module comprising instructions for determining whether a user has accessed an Internet site within said category and thereafter notifying said user that any Internet access will be stored to a log file.

A further embodiment is a method for controlling user access to categories of Internet sites. This embodiment provides a method of: referencing a categorized database of Internet sites; determining the category of Internet site that is being accessed by a user; and determining whether a user has spent a preset amount of time on an Internet site within said category and, responsive to said determination, blocking the user's further access to the site.

One other embodiment is a method for providing postponed access to specific sites on the Internet, comprising: referencing a categorized database of Internet sites; determining the category of Internet site that is accessed by a user; and determining whether said user requests a postponed access to an Internet site within said category, and responsive to said determination, storing pages from the requested the Internet site to a storage.

Still one other embodiment is a method for controlling access to categories of Internet sites. This method includes: referencing a categorized database of Internet sites; determining the category of Internet site that is accessed by a user; and determining whether a user has accessed an Internet site within said category a predetermined number of times and, responsive to said determination, blocking the user's further access to the site.

A further embodiment is a method for controlling access to Internet sites, comprising: referencing a categorized database of Internet sites; determining the category of Internet site that is accessed by a user; and determining whether a user has accessed an Internet site within said category and thereafter notifying said user that any Internet access will be stored to a log file.

BRIEF DESCRIPTION OF THE DRAWINGS

FIG. 3 is a block diagram of the tables within the training database described in FIG. 2.

DETAILED DESCRIPTION

Figure 1:
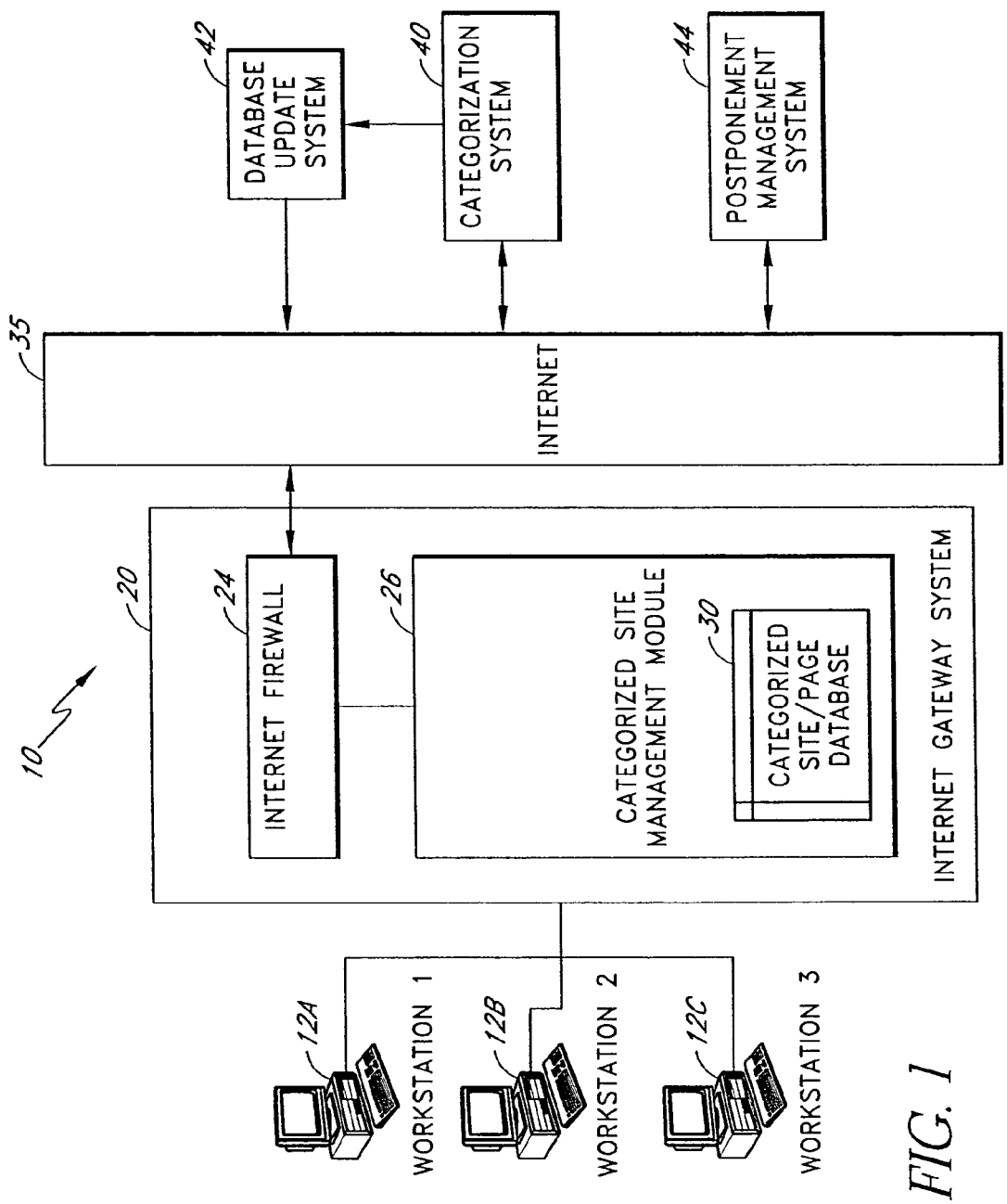
FIG. 1 is a block diagram providing an overview of one embodiment of a system for blocking access to Internet sites.

Embodiments of the invention relate to systems and methods for providing flexible access to Internet sites. For example, as described below, in one embodiment, the system does not simply allow or deny access to Internet sites. A user can be provided with several options for accessing sites that are found within the categorized database.

For example, in one embodiment, the user is presented with the option of postponing access to the desired site until another time of the day. If the user chooses to postpone access, a copy of the requested URL, and even pages, are copied to a database on an Internet server. The user is then allowed access to the database at a later time of the day. This system grants employers the ability to provide users with access to, for example, sports sites, but only during lunch or after work.

In another embodiment, the amount of time, or number of times, a user accesses a particular site is tracked. Thus, if a user spends more than a predetermined amount of time on a particular site, they will be barred from accessing that site for the rest of the day. Of course, the time schedule can be set to any combination of time that is preferred by the employer. In addition, a maximum number of times that the user visits a site that is within a particular category can also be controlled. Thus, a user might be allowed only 10 visits to a sports site within any 24 hour period.

The system described herein also provides access to Internet sites within particular categories, but only after notifying the user that their access to the chosen site will be logged for review. Thus, if the user has a legitimate reason for accessing the site, they will not be blocked. However, users without legitimate reasons for accessing the desired site will be allowed to cancel their site request and not be logged as having requested the site.

Creating a Database of Categorized Internet Sites

Embodiments of the system also provide methods for automatically categorizing Internet pages to create and update a database of categorized sites. This categorized database is then used within an Internet access control system to control user's access to Internet sites within certain categories. For example, if the system described herein assigns a particular Internet page to a "Sports" category, users that are restricted from viewing sports pages on the Internet will not be granted access to the requested site. In one embodiment, the system is installed within an Internet Gateway computer that controls traffic from the user to the Internet. Because the system described herein becomes more accurate with each page that is scored, minimal user intervention is required to assign pages to categories.

As will be described in detail below, embodiments of this system include a training database that is created by analysis of lexical elements appearing on Internet sites that are strongly associated with a particular category. In this context, a lexical element is a word or plurality of words that appear on the site under analysis. Examples of lexical elements include individual words, word pairs, adjacent words, and triplets of words. Thus, in order to train a "Sports" category, for example, a site for a football team would be fed into the system.

As a first step, each category, such as Sports, is trained to recognize words, words pairs and word adjacencies that are particularly relevant to their category. As discussed herein, a word pair means any two words that appear anywhere on a page. In contrast, a word adjacency is any two words that appear next to one another. Thus, the word adjacency "football team" would be given a strong relevance score to the Sports category. However, this same word adjacency would be given a low relevance score to the Internet Commerce category.

Once a training database has been created of word pairs and word adjacencies, along with their relevance score for each predefined category, any new pages appearing on the Internet can then be analyzed based on the relevance of word pairs/adjacencies appearing in the new pages. For example, a new Internet page having the word adjacency "football team" would be scored highly for the Sports category, but have a low relevance to the Internet Commerce category.

Moreover, by continuing to train each category with pages that have been confirmed to be within a particular category, the system can become increasingly accurate. With each training session, the relevance scores of lexical elements within each page are either increased to indicate a higher relevance to the category, or decreased to indicate a lower relevance to the category.

By using an automated Internet site retrieval program, embodiments of the system provide a database of categorized Internet sites and pages that is constantly updated with new Internet pages as they appear on the World Wide Web. Thus, embodiments of the system provide an efficient system for scoring and categorizing Internet pages.

Overview of the Categorization Process

An embodiment of the automated categorization system, as described below, includes computer instructions that, when run, evaluate the source page of an Internet site and categorize the given URL into one of several categories. The system includes three equations that score for:

| | | |
|---|---|---|
| 1. | Single Word Relevance | Example: In Category 2, "sex" = 4040. |

| | | |
|---|---|---|
| 2. | Word Pair Relevance | Example: In Category 2, "sex" and "porn" = 6005 |
| 3. | Word Adjacency Relevance | Example: In Category 2, "hardcore sex" = 8050 |

In addition, in other embodiments, equations which score for multiple word associations, such as word pairs, word adjacencies and combinations of higher degrees (triplet, quadruplets, etc.) can be implemented.

The categorization system is first trained by collecting a representative number of Internet sites that best represent the various facets of a given category. These sites are run through a training algorithm that assigns a relevance score to the words, word pairs and word adjacencies found in the Internet sites to the selected category. The result of the training process is a composite of the Internet sites called a "category prototype." The category prototype is a collection of the single word, word pair, and word adjacency relevance scores.

Once a category prototype has been generated for each category, the words, word pairs and word adjacencies from new Internet sites are tested against the category prototypes to determine if the new page should be categorized within any particular category. For example, if the word "sex" occurs on a source page, the computer checks the category prototype and retrieves a relevance score of 4040 for this word within Category 2 (Sex). If the word pair, "sex, porn" occurs on a source page, the computer checks the category prototype and retrieves the score of 6005 within Category 2 (Sex) for the word pair "sex, porn". This process is repeated for every word pair and word adjacency on the retrieved page. These scores are then used to calculate a category rating for the retrieved page.

The category rating is used to evaluate the probability that a page should be placed in a given category. For instance, if a URL has a category rating of 5000 within category two, then its associated probability of being within that category might be 0.99. This means that if there were 100 sites, each with a category two rating of 5000, then 99 of those sites belong in category two. In general, as the category rating increases, the probability that the corresponding site belongs to that category also increases. Consequently, it is possible to use this feature to establish a cut-off point that maintains 99% accuracy (or any other accuracy).

One goal of the process is to obtain two cut-off points within each category: the alpha point and the beta point. These two points create benchmarks against which decisions concerning a site's categorization can be made. The alpha point is chosen to maintain a sorting accuracy of, for example, 99%. As is known, the sorting accuracy is simply the computer's ability to correctly sort sites into a specific category. The Alpha point can be calculated for any category by using the following equation:

$$Ap = M_7 + 4(SD_7),$$

where, Ap=alpha point, $M_7$=the average category rating of the incorrectly sorted sited within the specific category, and $SD_7$=the standard deviation of the category rating for the incorrectly sorted sites within the specific category. This ensures 99 percent sorting accuracy because we are calculating four standard deviations away from the mean score, and should generalize to the Internet at large for the given category.

The beta point's sorting accuracy will undoubtedly vary between categories. However, it may generally maintain a sorting accuracy between the ranges of 75 to 85 percent. The beta point can be found using the equation:

$$Bp = M_7 + 1(SD_7),$$

where, Bp=beta point, $M_7$=the average category rating of incorrectly sorted sites within the specific category and $SD_7$=the standard deviation of the category rating for the incorrectly sorted sites within the specific category. Sites that fall between the beta point and the alpha point will be placed into a Suggest Database to be viewed by Web Analysts or technicians. It should be noted that each category will be assigned its own unique alpha and beta points.

As discussed below, embodiments of the system include the one or more modules. These modules include software instructions that are run on processors within the computer system. The modules can also include storages, such as Random Access Memory (RAM), Read Only Memory (ROM), Electrically Erasable Programmable Read Only Memory (EEPROM), hard disks or other computer storage devices.

FIG. 1 provides an overview of a system 10 for controlling access to particular sites on the Internet. As shown, a plurality of workstations 12A-C are connected through a local area network 15 to an Internet gateway system 20. The workstations 12A-C are preferably Intel Pentium class personal computers operating under the Microsoft Windows Operating System. Of course, it should be realized that any conventional personal computer, such as those manufactured by Apple, IBM, Compaq, Dell, Digital Equipment Corp. (DEC) or other system, can be used.

The local area network 15 is preferably an Ethernet 10baseT topology, but can be based on any well-known networking protocol, including wireless networks, token ring networks and the like. The local area network 15 communicates with the Internet Gateway system 20 in order to provide the workstations 12 A-C with TCP/IP communication to sites on the Internet 35. Such gateways are well known in the art and normally communicate through routers or other data packet switching technology for translating Internet TCP/IP protocols into the proper protocols for communicating across the local area network 15.

Within the Internet gateway system 20 is an Internet firewall module 24 that monitors data packets flowing to and from the Internet 35. The firewall module 24 controls access between the workstations 12A-C and the Internet so that unauthorized users cannot gain access to computer resources on the local area network 15. Thus, all communication between the Internet and the network server 15 first passes through the firewall 24. Many firewall software programs are available, such as Firewall-1 (Check Point software, Redwood City, Calif.). However, it should be realized that while the embodiment described in FIG. 1 relies on a firewall to control access of data packets between the Internet and the workstations 12A-C, other similar access control systems are available. For example, the Microsoft proxy server (Microsoft Corp., Redwood City, Wash.), Netscape proxy server (Netscape Corp) and the Open Server implementation of Cisco's Pix Firewall (Cisco Corp.) are currently available and can be implemented in place of the firewall 24.

Within the Internet gateway system 20, and communicating with the firewall 24 is a categorized site management module 26 that includes instructions for analyzing Internet site requests from the workstations 12A-C and then comparing those Internet site requests with a categorized site/page database 30. If the requested page is found within the database 30, it will either be blocked or allowed depending on the access rights granted to the user within the management module 26. As illustrated, the categorized site management module 26 communicates with the firewall 24 to allow or control access to the Internet 35.

Also connected to the Internet 35 is a categorization system 40 that, as described below, categorizes websites and pages in order to create the categorized site database 30. Once sites on the Internet have been categorized by the categorization system 40, a database update system 42 thereafter routinely copies the updated database from the categorization system 40 to the Internet gateway system 20. As can be imagined, the system can include hundreds of gateway systems, each of which is updated regularly by the database update system 42 to provide an updated database of blocked Internet sites. Moreover, the database update system 42 can preferably only transfer portions of the database to the gateway system 20 so that the entire database does not need to be transmitted.

Also communicating with the Internet 35 is a postponement management system 44 that, as explained below with reference to FIG. 4, manages Internet sites that have been saved for postponed access by users. As will be explained, the system provides users with the ability to store desired Internet sites for review at a later time.

Overall, FIG. 1 illustrates one embodiment of a system for providing controlled access of workstation computers to the Internet. Each request from a workstation for an Internet address (e.g.: page or site) is first compared to a categorized database of Internet addresses. If the requested address is found within the categorized database, a management module accesses a user permissions table to determine if the requesting user has rights to view sites within the category that is associated with the requested page. If the user has access rights to view pages within the category, the page request is sent to the Internet. However, if the user does not have any access rights, the user is blocked from receiving the requested page from the Internet.

Figure 2:
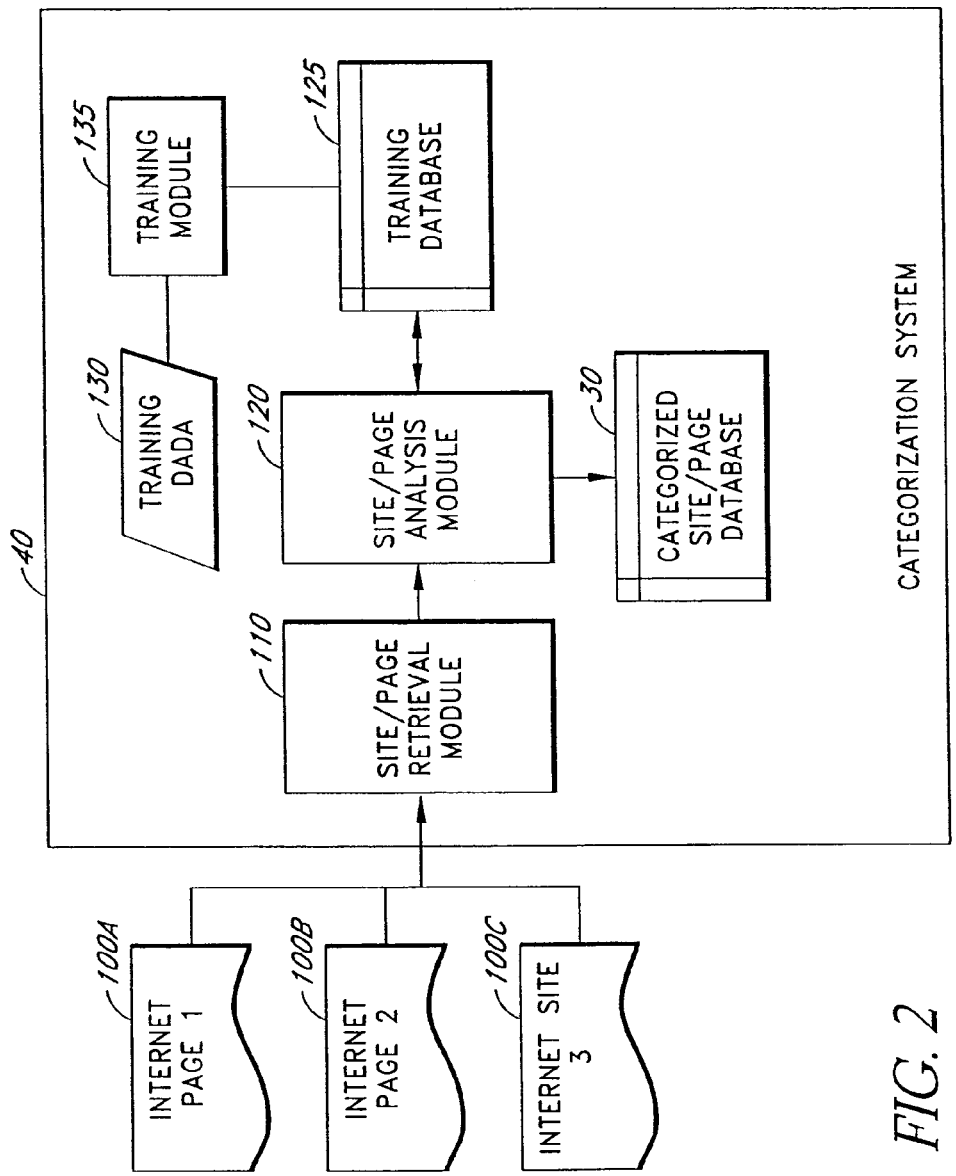
FIG. 2 is a block diagram illustrating the categorization system found in FIG. 1.

Referring to FIG. 2, the categorization system 40 (FIG. 1) is explained in more detail. As illustrated, Internet pages 100A, B and Internet site 100C are retrieved by a site/page retrieval module 110. Within the site/page retrieval module 110 are instructions for searching and retrieving Internet pages and sites from the Internet. One exemplary method for retrieving such sites is illustrated below in FIG. 7.

Once an Internet site or page has been retrieved by the retrieval module 110, it is forwarded to an analysis module 120 in order to determine which category (or categories) is most strongly related to the retrieved site. The process for analyzing an Internet page for its relevance to one or more categories is explained in more detail below in FIG. 5.

As illustrated, the analysis module 120 is linked to a copy of the categorized database 30' and a training database 125. The analysis module 120 calculates the relevance of the retrieved Internet page to each of the predefined categories by analyzing the word pairs and word adjacencies within the page. In order to provide this analysis, the training database 125, as explained below, includes category relevance scores for each word pair and word adjacency that might be found on the page. Thus, by comparing the word pairs and word adjacencies within the retrieved page to the scores for those word pairs and adjacencies within the training database, a total relevance score for the page within each category can be determined. Once a page relevance score has been calculated for the page in each category, a determination is made whether the relevance score for each category is high enough to warrant assigning the retrieved score to any category.

As discussed below, the determination of whether to assign a retrieved page to a particular category is made by comparing the page's relevance score for a particular category with a predetermined alpha value. If the page relevance score is higher than the alpha value for the category, the page is assigned to that category. If the score is lower than the alpha value, but greater than a beta value, the page is forwarded to a manual scoring system wherein technicians view the retrieved page and determine whether or not to include the page within the category. If the relevance of the page for a category is below the beta value, the page address is stored to a database of analyzed sites, and the system continues to score additional addresses.

The data within the training database 125 is created by providing training data 130 to a training module 135, as illustrated. The training data 130 includes Internet pages strongly associated with each category to be trained. For example, in order to train a Sports category, the training data might include the Internet address of a sports franchise or other sports website. The training module 135 then parses the word pairs and word adjacencies for each page within the given sports site. Any unique word pairs and word adjacencies, as described below, are then assigned high relevance scores in the Sports category within the training database. Thus, similar words and word pairs appearing on new pages will be given high relevance scores to the Sports category.

Referring to FIG. 3, one embodiment of a training database 125 is illustrated. Within the training database 125 is a word identification table 200 that includes lists of words and a corresponding ID number for each word. This table allows every word pair or word adjacency referenced in the database to be represented by two numbers instead of two words. Since, in general, the number of characters in the ID number is less than the number of characters in the word itself, much less data storage space is required within the training database to store numerical representations of each word instead of the word itself. In addition, well-known words, such as "the" and "and" can be represented by single-digit numbers so that only one byte of data is taken to represent these common words. However, as discussed below, such common words are normally discarded prior to scoring an Internet page so that the lexical elements on each page will be more readily differentiated from every other Internet page. This provides a more advantageous page scoring system.

In addition to the word identification table 200 is a category identification table 205 that provides a category ID number for each category within the system. The category identification table 205 also includes an alpha and beta score that provide the cut-off values for assigning a particular page to the selected category. For example, as illustrated in FIG. 3, the Sports category includes an alpha score of 920 and beta score of 810. If an Internet page is found to have a page relevance score of greater than 920 for the Sports category, it will be assigned to the Sports category. However, if the Internet page is found to have a page relevance score of between 810 and 920, it will be flagged for manual follow-up by a technician to determine whether or not it belongs within the Sports category. If the Internet page is found to have a page relevance score of below 810 for the Sports category, then it will not be flagged as being related to the Sports category. By using these values, the system determines whether or not to assign a particular page to one of the predefined categories.

Also within the training database 125 is a word relevance table 210 that provides the relevance scores of word pairs and word adjacencies with particular categories in the system. For example, the word "Cleveland" (ID No. 234) and the word "Browns" (ID No. 198) are illustrated with a word adjacency relevance score of 900 to category 1 (Sports).

Because, in this illustration, the maximum relevance score is 1,000, the word adjacency "Cleveland Browns" is very strongly associated with the Sports category. Thus, any Internet page having the words "Cleveland Browns" adjacent one another will have their total page score raised in the Sports category due to the strong relevance of these words to sports.

Note that the words "diamond" (ID No. 755) and "jewelry" (ID No. 1345) only have a relevance score of 290 within the Sports category. However, the word pair "diamond" and "jewelry" is illustrated with a relevance score of 940 in category 3 (Shopping). Thus, as illustrated, any page having both of these words will be more strongly associated with the shopping category, and more weakly associated with the Sports category.

Figure 4:
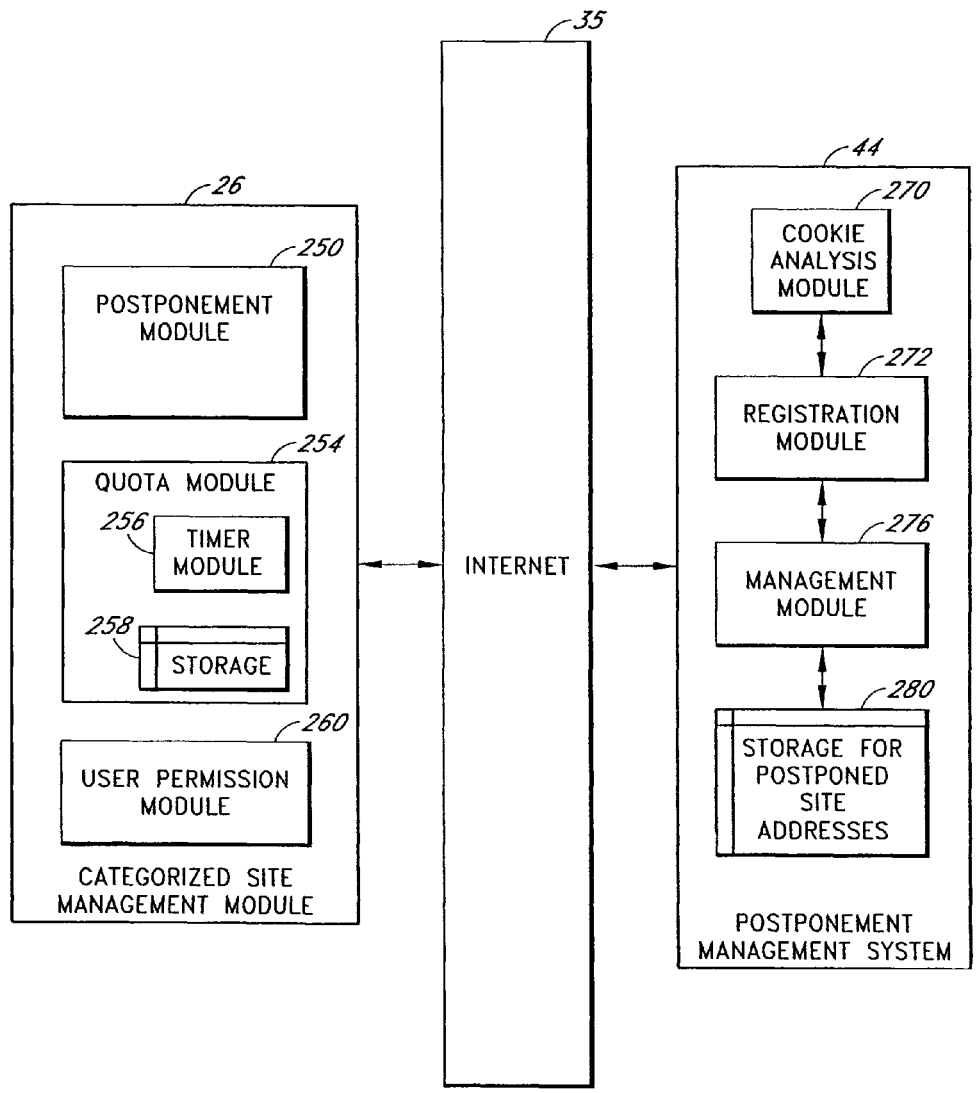
FIG. 4 is a block diagram illustrating one embodiment of a system for providing postponed access to Internet sites.

Referring now to FIG. 4, the interaction between the categorized site management module 26 and the postponement management system 44 is explained more completely. As illustrated, the categorized site management module 26 includes a postponement module 250 that includes instructions for providing the system with its ability to postpone access to specific sites on the Internet. The processes running within the postponement module 250 are explained below with reference to FIGS. 9 and 10.

Figure 11:
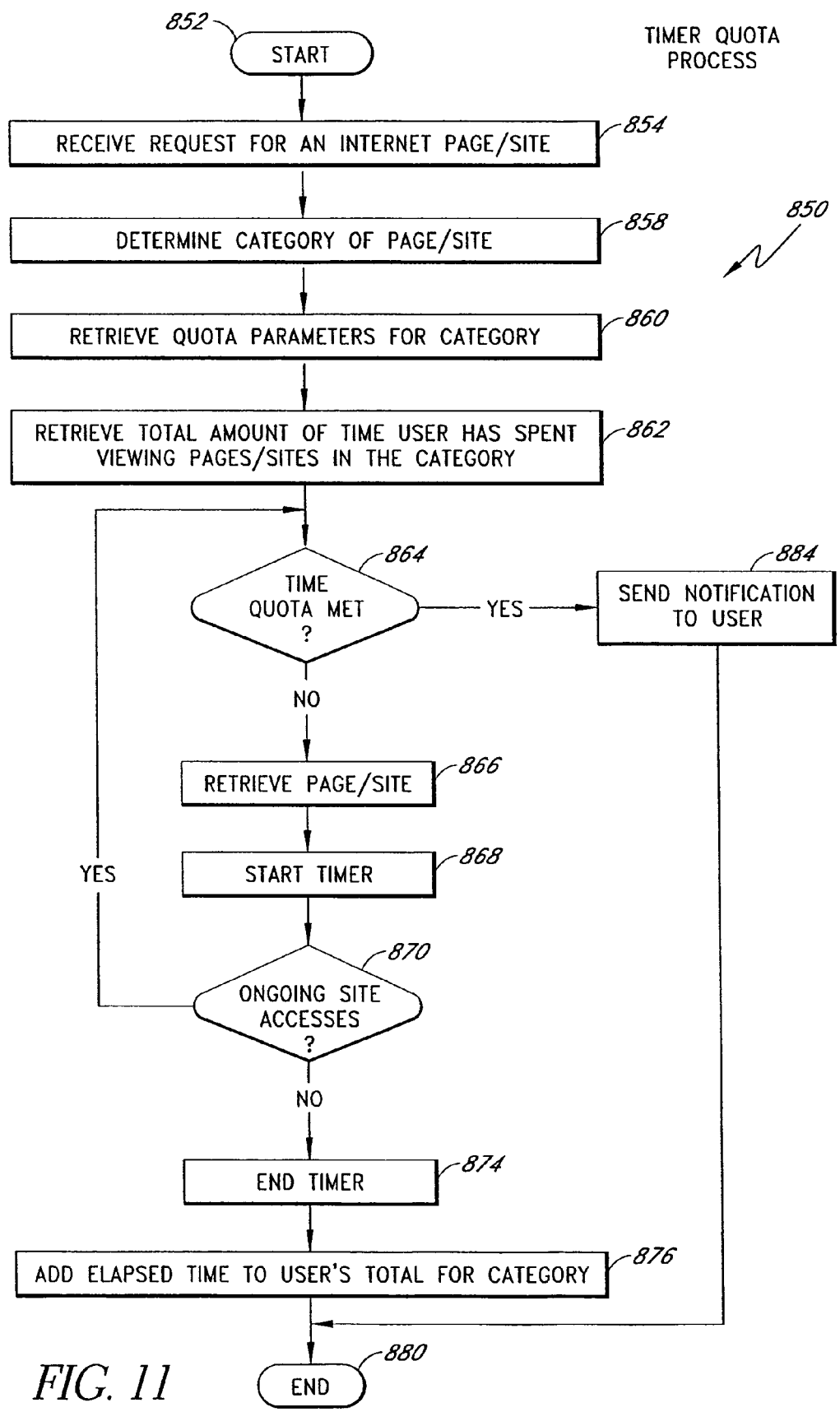
FIG. 11 is a flow diagram illustrating one embodiment of a process for measuring the amount of time a user has spent on an Internet site and blocking access to the Internet once a pre-determined time period has been met.

Also within the categorized site management module 26 is a quota module 254. The quota module 254 includes instructions and commands for determining whether a user has exceeded a particular quota for accessing sites on the Internet. The process for determining whether a user has exceeded a timer quota is illustrated in FIG. 11. This process runs within a timer module 256 within the quota module 254. In addition, the quota module 254 includes a data storage 258 for recording the number of times a particular user has accessed an Internet site, or the amount of time a user has spent reviewing a particular Internet site.

The management module 26 also includes a user permissions module 260 which provides data storage, commands and instructions for determining whether a particular user is restricted from accessing particular sites, or is subject to the requirements of the postponement module 250 or quota module 254.

Communicating with the management module 226 is the postponement management system 44. This system is normally running within a server attached to the Internet 35. The postponement management system 44 includes the instructions and commands for providing postponed access to Internet sites requested by particular users.

Within the postponement management system 44 is a cookie analysis module 270 that provides instructions for determining the identity of the user currently accessing the system. As is known, "cookies" are data strings stored on a user's computer that can include specific user identification numbers. These unique user identifications numbers allow the postponement management system 44 to know the identity of the user currently accessing the system.

In communication with the cookie analysis module 270 is a registration module 272 that is provided to allow new users to register within the postponement management system. Thus, if a cookie is not found on the user's computer, the user is directed towards the registration module 272 in order to register for access to the postponement management system 44.

The postponement management system 44 also provides a management module 276 that oversees user's access to postponed sites within the system 44. Thus, when a user attempts to access their stored site, the management module 276 determines the appropriate stored sites and directs the user to those stored pages. As illustrated, the management module 276 communicates with a storage 280 which holds the actual pages that were postponed from a previous viewing attempt by the user. This process of storing and viewing postponed pages will be explained more completely below with reference to FIGS. 9 and 10.

Figure 5:
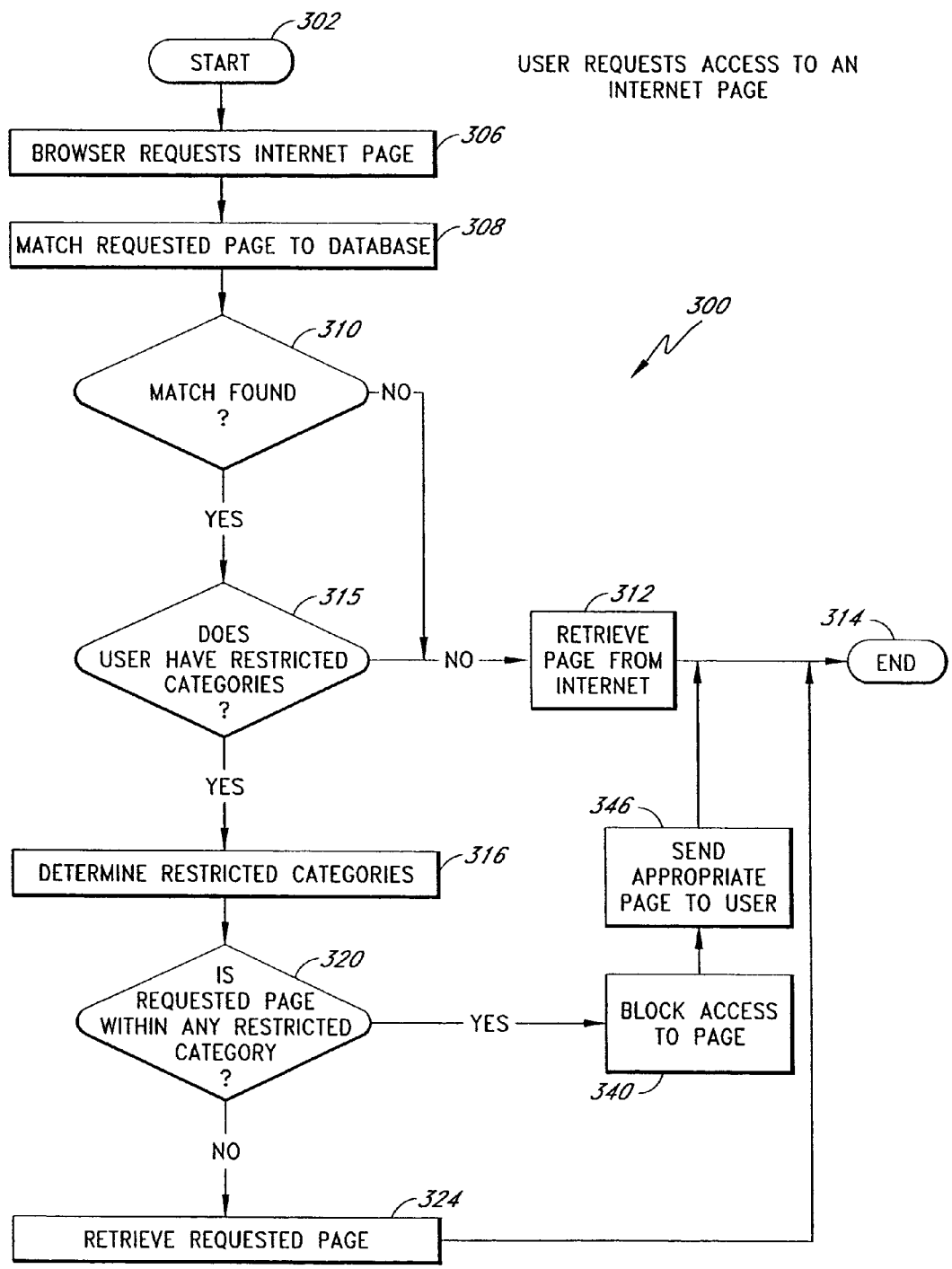
FIG. 5 is a flow diagram illustrating the process of a user requesting access to an Internet page.

Referring to FIG. 5, an overall process 300 of requesting access to an Internet page or site is illustrated. The process 300 begins at a start state 302 and then moves to a state 306 wherein an Internet browser on a workstation computer 12A-C requests an address on the Internet. Well-known browsers include Microsoft Explorer and Netscape Navigator. The browser request is normally made after a user has entered a desired URL into their browser software.

The user's request is then sent across the local area network 15 to the Internet Gateway system 20. The process 300 then moves to a state 308 wherein the requested Internet address is matched against the categorized database 30. It should be noted that the address can be a single page within an Internet site, or the default address of the site (e.g.: www.company.com).

A determination is then made at a decision state 310 whether an address match has been made with any address stored in the categorized database. If no match was found within the categorized database 30, the requested page is retrieved from the Internet at a state 312 and the process terminates at an end state 314.

However, if an address match between the requested address and the categorized database is found, the process 300 moves to a decision state 315 wherein a determination is made whether the current user has restricted access rights to specific categories of Internet pages. This determination can be made by reference to a list of network users, and an associated permissions table for each category found within the categorized database. Thus, a particular user may be restricted from access to all Sports and Pornography categories but not restricted from Internet Commerce or Travel categories. An exemplary list of Internet categories is provided below in Table 1.

TABLE 1

Listing of Categories

| Category | Description |
|---|---|
| Abortion Advocacy | Abortion advocacy, pro or con. |
| Activist Groups | Organizations with a cause. This is a broad category that can include environmental groups and any other activist group not covered under other categories. Note: No special exceptions are made for Freedom of Speech activist sites. |
| Adult Entertainment | Full or partial nudity of individuals. This might include strip clubs, lingerie, adult-oriented chat rooms, erotica, sex toys, light adult humor and literature, escort services, password-verification sites, prostitution, and so forth. Sexually explicit language describing acts that would fit into this category are also categorized here. |
| Alcohol/Tobacco | Any site promoting, containing, or selling liquor or tobacco products, or their accessories. |
| Alternative Journals | Online equivalents to supermarket tabloids, or non-mainstream periodicals. Note: This category may contain materials that are sexual in nature. |
| Cult/New Age | Promoting or containing information on witchcraft, black arts, voodoo, spirituality, horoscopes, alternative religions, cult, UFOs. All religions not covered under the Religion category. |
| Drugs | Promotion of illegal drugs and/or drug culture information, or drug-related contraband. Note: As legality of drugs varies by country, the drug laws of the United States are used. |
| Entertainment | Sites promoting/containing information on movies, radio, television, books, theater, sedentary hobbies, magazines (non-business related), music, pets, humor/jokes, and sites containing downloadable software of an entertaining nature. Note: Computer magazines containing technical information are not included in this category. |

TABLE 1-continued

Listing of Categories

| Category | Description |
| --- | --- |
| Gambling | Any site that promotes gambling or allows online gambling. |
| Games | Information about or advocacy of board games, electronic games, video games, computer games, or on-line games. Includes both hardware and software. |
| Gay/ Lesbian Lifestyles | Information about gay and lesbian lifestyles that does not contain sexually explicit images or text. Dating services and shopping sites that cater to gay or lesbian customers. |
| Hacking | Any site promoting questionable or illegal use of equipment and/or software to hack passwords, create viruses, gain access to other computers, and so on. Does not include security information sites. |
| Illegal | Promotion or information describing how to commit non-violent, illegal activity such as drunk driving, mail fraud, picking locks, white or blue collar crime of a non-technical nature. Note: U.S. laws are used as a guide. |
| Job Search | Personal job/career search sites. |
| Militancy | Any site promoting or containing information on militia operations, terrorist activity, war, riots, rebellion groups. Advocates of violence to overthrow governments. |
| Personals/ Dating | People meeting other people, personal ads, mail order brides. Sites combining heterosexual and gay personals on the same site are included here. Dating and personals sites that accommodate only gay and lesbian lifestyles are categorized under Gay/Lesbian Lifestyles. |
| Politics | Political advocacy of any type. Any site promoting or containing information on any political party, pro or con. This includes all registered and otherwise officially recognized political parties. Excludes all official government sites. |
| Racism/ Hate | Ethnic impropriety, hate speech, anti-Semitism, racial clubs/conflict. |
| Religion | Religious advocacy, pro and con. Limited to: Atheism, Buddhism, Christianity, Hinduism, Island, Judaism and Shintoism. |
| Sex 1 | Heterosexual activity involving one or two persons, hard-core adult humor and literature. Sexually explicit language describing acts that would fit into this category are also categorized here. |
| Sex 2 | Heterosexual acts involving more than two people, homosexual and bisexual acts, orgies, swinging, bestiality, sadism/masochism, child pornography, fetishes and related hardcore adult humor and literature. Sexually explicit language describing acts that would fit into this category are also categorized here. |
| Shopping | Consumer-oriented online shopping. Includes real estate shopping. Excludes sites that sell sex toys, weapons, alcohol, tobacco, vehicles and vehicle parts or travel services. Note: The entire site is screened if the intent of the site is selling. |
| Sports | Sports and sports-related recreation. Team or individual activities, indoor or outdoor, with a physical component. For example, body building, hiking, camping, and football. |
| Tasteless | Offensive or useless sites, grotesque depictions caused by "acts of God." |
| Travel | Sites promoting or containing information on travel, leisure, vacation spots, transportation to vacation destinations. |
| Vehicles | Any site promoting vehicles, including: cars, vans, trucks, boats/water craft, ATV's, trains, planes and any other personal vehicles and vehicle parts. Vehicles within this category do not carry weapons. |
| Violence | Any site promoting or containing information on violent acts, murder, rape, violent criminal activity, gangs, gross depictions caused by acts of man, excess profanity. |
| Weapons | Any site promoting/containing information on guns, knives, missiles, bombs, or other weapons. |
| Web Chat | Chat sites via http protocol, chat rooms (non-IRC), forums and discussion groups. Home pages devoted to IRC. |

Once a determination has been made at the decision state 315 that the user has restricted categories, the process 300 moves to a state 316 to determine which categories have been blocked for this particular user. This determination is made by reference to permissions list associated with the user.

The process 300 then moves to a decision state 320 to determine whether the requested page is within any of the restricted categories for this particular user. This determination is made by first determining the category of the requested address from the categorized database, and then comparing that result with the restricted categories for the user. If a determination is made that the requested page is not within one of the user's restricted categories, the revised page is retrieved at a state 324 and the process terminates at the end state 314.

If a determination is made at the decision state 320 that the requested page is within one of the user's restricted categories, the process 300 moves to a state 340 wherein access to the page is blocked. This blocking can occur by discarding the packet request from the user to the Internet, or simply closing the connection that was requested by the Internet browser to the requested page. The process 300 then returns an appropriate page notifying the user that their request has been denied. The process 300 then terminates at the end state 314.

Thus, FIG. 5 provides an overview of one process for requesting and blocking access to particular Internet addresses based on whether the requested page appears within the categorized database 30. FIG. 5 provides a method for creating the categorized database 30 by analyzing the content of word pairs and word adjacencies within Internet pages.

Figure 6:
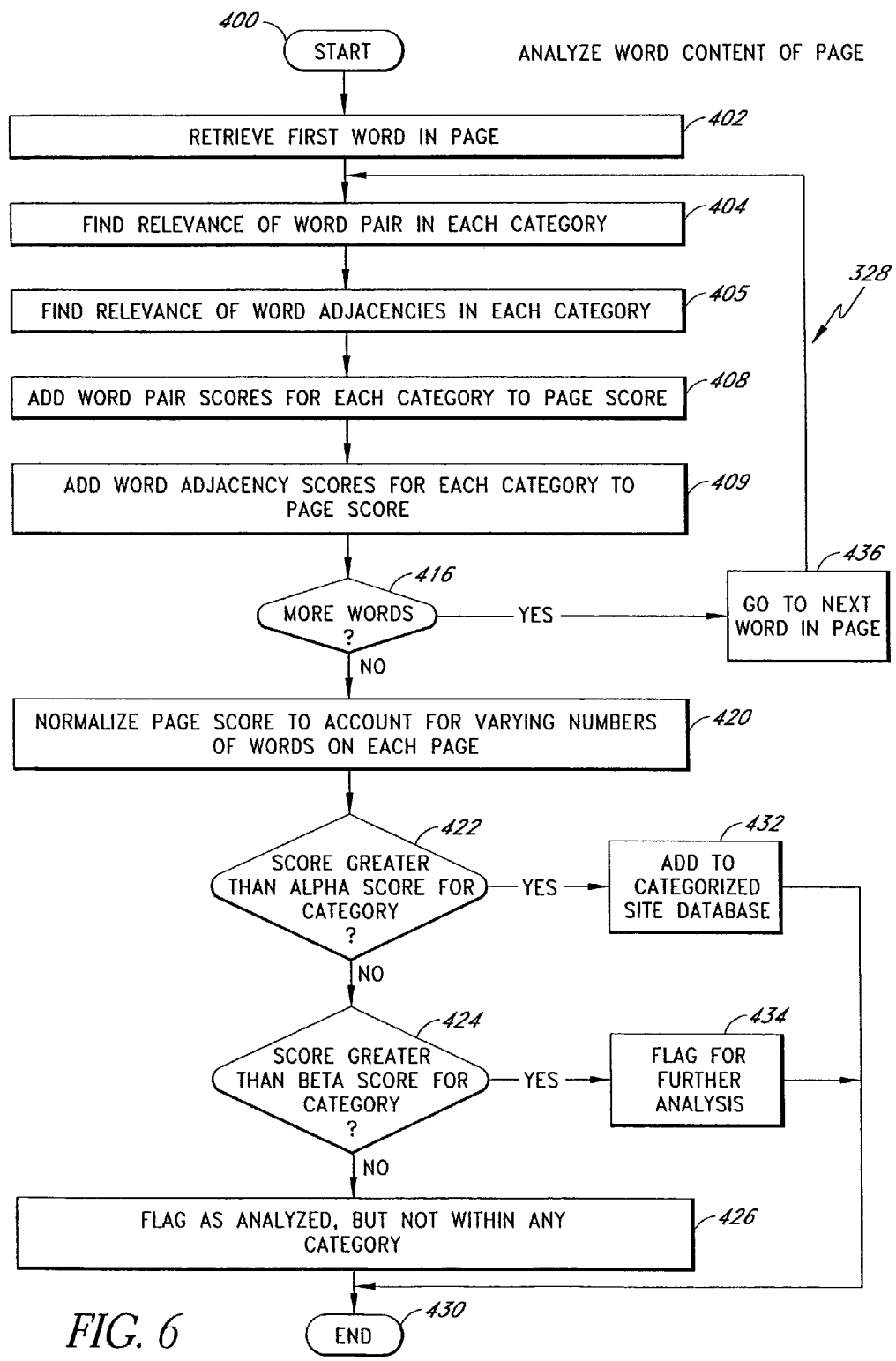
FIG. 6 is a flow diagram illustrating the "Analyze Word Content of Page" process found in FIG. 5.

Referring to FIG. 6, a process 328 of analyzing the word content of pages to determine their relevance to particular categories is illustrated. The process 328 begins at a start state 400 and then moves to a state 402 wherein the first word in an Internet page is retrieved. As used herein, the term "word adjacency" includes words that are directly adjacent one another. The term "word pair" includes any two words that are located on the same Internet page.

Once a first word from the page has been retrieved at the decision state 402, the process 328 moves to a state 404 wherein the relevance of every word pair that contains the first word in the page is determined for each of the defined categories. Thus, the first word and the third word in the page are determined, and that word pair is compared against the word relevancy table 210 in the training database to determine its relevance score in each of the listed categories. This relevance score is determined by reference to the word relevance table 210 (FIG. 3) which lists each word pair and its associated relevance to every category. In one embodiment, the relevance score of a word pair within a particular category varies from 0 to 1,000, with 1,000 being a word pair that is perfectly associated with a category. Of course, various scoring systems can be developed that reflect the relevance of a particular word pair to a category. It should also be understood that a maximum distance between any two words within a word pair can be set. For example, the system may only analyze word pairs that are 10, 20, 30, 40 or more words apart, and then move to begin analyzing the next word in on the page.

The determined word pair relevance scores are then stored to a memory for later manipulation. The first word is then paired with the fifth word in the page to determine the new word pair's relevance to each category. This process is repeated for every possible two-word pair in the page that includes the first word.

The process 328 then moves to a state 405 wherein the relevance of the word adjacency of the first word and the second word is calculated by matching these words to the word relevance table 210 in the training database to determine their relevance to each category.

Once the relevance score for the retrieved word adjacency has been determined for every category, the process 328 moves to a state 408 wherein the relevance scores determined at the state 404 for each of the word pairs is added to the total page score for each category.

Thus, if the word pair "Cleveland" and "Browns" returned a relevancy score of 900 from the word relevancy table in the Sports category, the numerical value 900 would be added to the total page score for category 1 (Sports). Thus, word pairs having higher relevance scores in a category will result in a higher overall page relevance score in the current category for that page. Similarly, word pairs having lower relevance scores in a particular category will reduce the overall page relevance score to that category.

Once the word pair relevancy scores for the page have been added to the total page relevance score, the process 328 moves to a state 409 wherein the word adjacency relevancies that were determined at state 405 for each category are added to the page relevance category scores for the current Internet page.

Now that the page scores for each category have been calculated, a determination is made at a decision state 416 whether more words exist on the page to be analyzed. If a determination is made that no more words are available for analysis on the retrieved Internet page, the process 328 moves to a state 420 wherein the total page relevance score for each category is normalized to take into account the fact that pages with more words will have higher scores. For example, since page scores are determined by adding the relevancies of word pairs and word adjacencies, a page with 500 words will have a substantially higher score in each category than a page with 100 words. Thus, for example, dividing the page relevance score within each category by the total number of words on the page will normalize the page score so that pages of differing lengths will have approximately the same page score in each category. It should be noted that categories having higher average relevance scores for each word pair and word adjacency will have a higher page score than those categories having word pairs with lower relevance scores.

Once a normalized page score has been determined in each category for the retrieved page, the process 328 moves to a decision state 422 to determine whether the page relevance score for the category is greater than the alpha relevance score for that category. This determination is made by reference to the category ID table 205 in the training database 125. If the page relevance score is not greater than the alpha score, the process 328 moves to a decision state 424 to determine if the page relevance score is greater than the beta score for the category. If a determination is made that the page relevance score is not greater than the beta score, the process 328 moves to a state 426 wherein the retrieved site is stored to a table and flagged as having been analyzed, but not within any category. The process 328 then terminates at an end state 430.

If a determination is made at the decision state 422 that the page relevance score is above the alpha score for the category, the process 328 moves to a state 432 wherein the retrieved address is added to the categorized database 30. It should be noted that the categorized database 30 includes not only the address of the Internet addresses to block, but also the category that the Internet site is associated with so that a determination can be made whether a user having particular permissions should be provided access to the site, even though it is categorized within the database.

In an alternative embodiment, if a determination is made that the page score is greater than the alpha score for the category, the system may run instructions that access the current page on the Internet. The instructions then begin to score the hierarchical pages of the site while moving towards the main domain address (e.g.:www.company.com). If a determination is made that any of higher nodes on the site are also above the alpha score for the same category, those sites are also added to the database. This provides the system with a mechanism for not only rating an individual page, but also the plurality of pages that appear below a specific node on an Internet site.

In one embodiment, the number of words that are considered on any page is limited to a predetermined number. For example, the system might be limited to only considering the first 100, 250, 500 or 1000 words on any page. Any words that follow the predetermined number would not be considered.

If a determination is made at the decision state 424 that the page relevance score is greater than the beta score, but lower than the alpha score, the process 328 moves to a state 434 wherein this address is flagged for further analysis by a technician. The process then terminates at the end state 430.

If a determination is made at the decision state 416 that more words are left to be analyzed in the retrieved page, the process 328 moves to a state 436 wherein the next word in the page is selected as the first word for each word pair and word adjacency. In this manner, the system "walks" across the page by analyzing each word in the page in conjunction with every other word. This provides a complete analysis of every possible word pair and word adjacency in the page.

Through the process 328 illustrated in FIG. 6, a newly retrieved Internet page is scored and associated with one or more categories within the system. Each page that is found to have relevancy score within any category that is greater than the alpha score for that category is added to the categorized database 30. for the categories that it is associated with. In addition, any page that is found to have a relevancy score that is greater than the less stringent beta score is flagged for analysis by a technician so that it can be manually added to the categorized database, if necessary. Through this mechanism, new Internet pages are added to the system on a regular basis.

Figure 7:
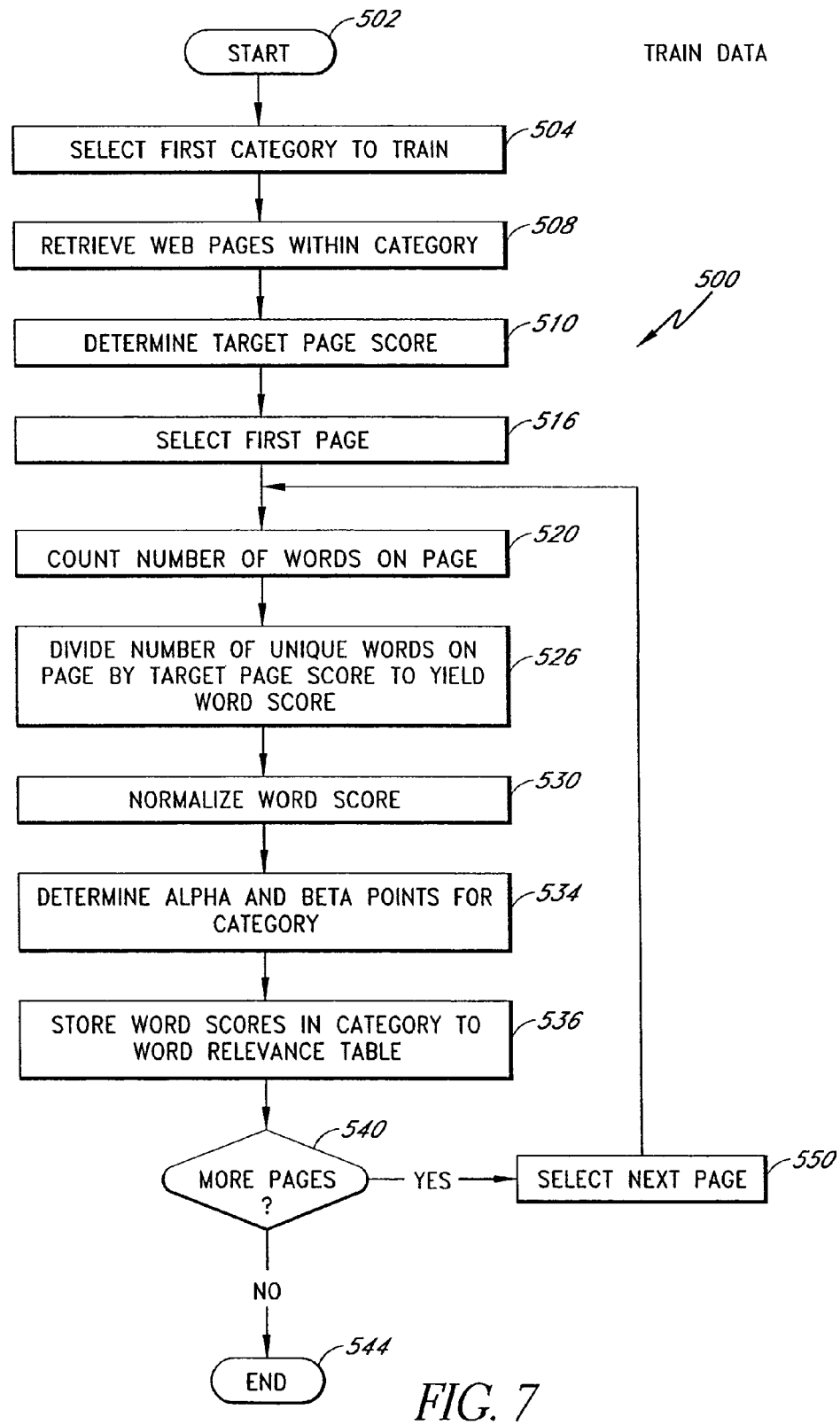
FIG. 7 is a flow diagram illustrating the process of training data that is performed within the training module of FIG. 2.

Referring to FIG. 7, a process 500 for creating the word relevance table 210 within the training database 125 is described. The process 500 begins at a start state 502 and then moves to a state 504 wherein a first category to train is selected. The category might be, for example, the Sports category. The process 500 then moves to a state 508 wherein web pages that have been predetermined to be within the chosen category (e.g., sports) are retrieved. Thus, because these pages are known to be within the category selected at state 504, the relevance of each word pair and word adjacency within the chosen page can be assigned a high relevance to the current category.

Once web pages within the chosen category are retrieved, the process 500 moves to a state 510 wherein a target page score is determined for the currently selected page. Normally, a page that is highly relevant to a particular category is given a score of, for example, 1,000. However, it should be realized that any similar type of scoring scale that is used to relate words to a category can similarly be implemented. Once the target page score is determined at the state 510, the process 500 moves to a state 516 wherein the first page of the retrieved pages is selected for analysis.

The number of words on the selected page is then counted at the state 520 and the process thereafter moves to a state 526 wherein the number of unique word pairs are divided by the target page score (1000) so that if the word pairs were re-scored, the total page relevance score would be 1000. Similarly, the target page score (1000) is divided by the number of unique word adjacencies to result in a word adjacency score that, if added together, would result in a page relevancy score of 1000 (extremely high relevance to the trained category). It should be noted that common words such as "a", "the" and "and" are ignored to minimize processing time and increase the accuracy of the scoring process. Moreover, computer language instructions and hypertext headers are also ignored in order to increase the accuracy of scoring the pages.

The process then moves to a state 530 wherein the current score for each word pair and word adjacency (1000) is averaged with the same word pair and word adjacency scores already stored in the word relevance table. Thus, if we are training the Sports category, and the word adjacency "Cleveland Browns" is found within the current page, it might be assigned a word adjacency value of 105 in the Sports category. However, if the term "Cleveland Browns" is already scored within the Sports category at a value of 89, the 105 value and the 85 value would be averaged to normalize the word adjacency score to the Sports category. This system therefore allows words that are used over and over within certain categories to be "up-trained" so that their relevance score with the chosen category will go up as they appear on more pages that are scored. In addition, it should be understood that the system is capable of parallel processing of a plurality of sites simultaneously.

The process 500 then moves to a state 534 wherein the alpha and beta scores for the category being trained are determined. The alpha score is the numerical score that, when exceeded, indicates that the selected page is clearly within a category. The beta score is the numerical score that, when exceeded, indicates that the selected page may be within a category. As discussed above, the alpha score is normally chosen so that 99% of the pages having that score are within the chosen category. The beta score is normally chosen so that 75-85% of the pages having that score are within the chosen category. These scores are determined by analyzing the average score of the trained pages in the category to determine cut-off values for new pages.

The word relevance scores are then saved to the word relevance table 210 in the training database 125 at a state 536. A determination is then made at a decision state 540 whether more pages that need to be trained are available. If no more pages are available, the process 500 terminates at an end state 544. If a determination is made that more pages do exist, the process 500 moves to a state 550 wherein the next page to be analyzed is selected. The number of words are then counted on the page at the state 520 and the process continues as described above.

Through the process 500 described above, a word relevance table is developed which includes normalized word relevances for every word pair and word adjacency that might be found in an Internet page. By analyzing new pages and by adding together the relevances of each word within the page, an automated system is provided for assigning a page relevance score for a particular page to each of the predetermined categories within the system. Thus, once a particular category has been trained by analysis of a large number of pages, the system can rapidly analyze new pages for their relevance to each of the predetermined categories. As described above in FIG. 2, a page retrieval module 110 is utilized for retrieving new Internet pages and sending them to the analysis module 120 for scoring.

Figure 8:
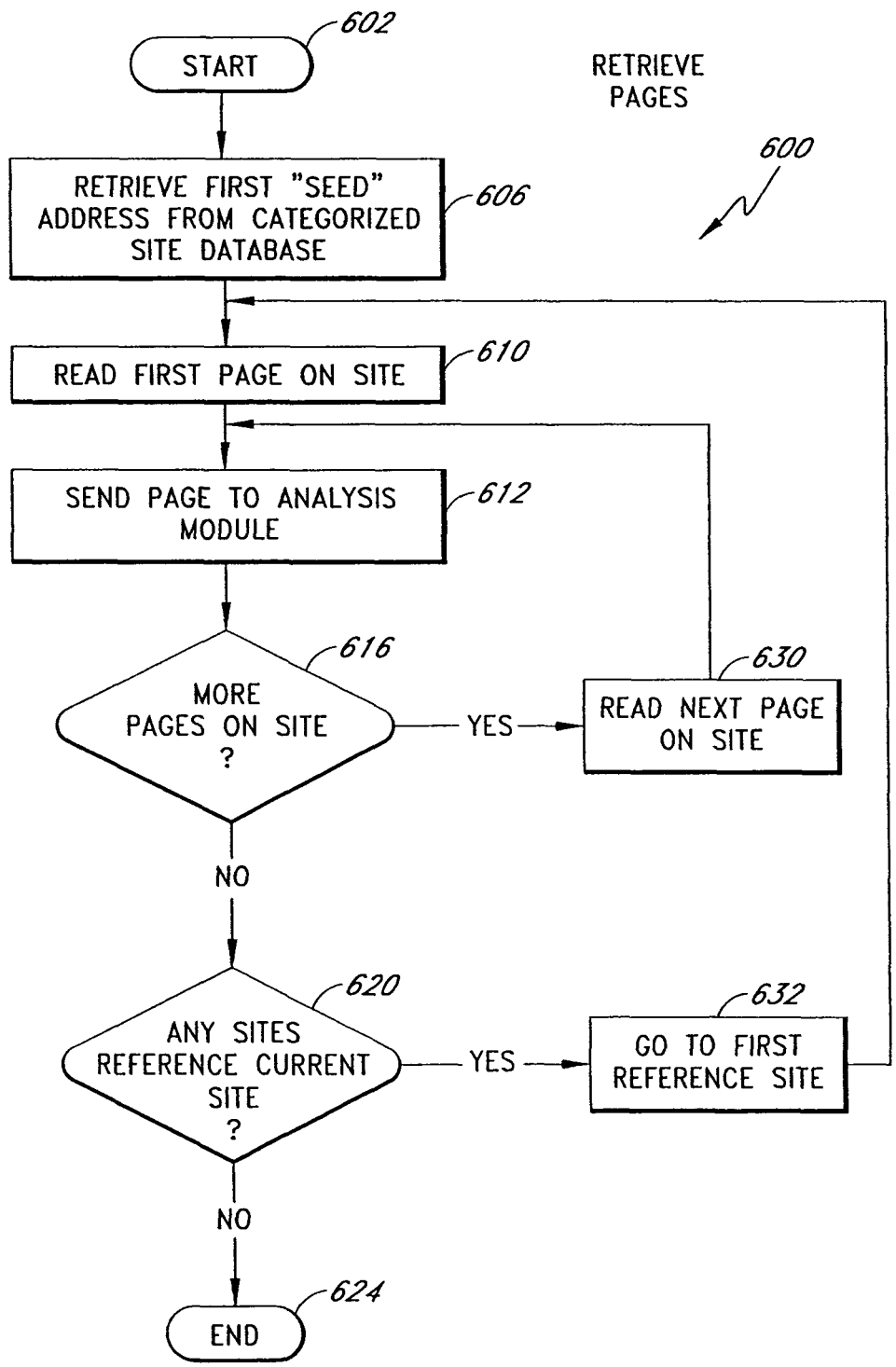
FIG. 8 is a flow diagram illustrating one embodiment of a process for retrieving pages performed by the site/page retrieval module of FIG. 2.

FIG. 8 provides an illustration of a process 600 for retrieving pages from the Internet. The process 600 begins at a start state 602 and then moves to a state 606 wherein the address of the first site to categorize is determined by random access of an address from the categorized web database 30. Once an address of a first site to categorize is determined at the state 606, the process 600 moves to a state 610 wherein the first page of the Internet site is read. The process then moves to a state 612 wherein the page that has been read is forwarded to the analysis module 120 so that the word pairs and word adjacencies on the page are analyzed for their relevance to a predetermined category.

The process 600 then moves to a decision state 616 in order to determine whether more pages exist on the current site to be analyzed. If no more pages exist on the current site, the process 600 moves to a decision state 620 to determine whether any sites on the Internet reference the currently analyzed site. If no more sites reference the current site, the process 600 terminates at an end state 624.

If more pages do exist to be analyzed at the decision state 616, the process 600 moves to a state 630 wherein the next page on the current site is read. The process then continues to state 612 wherein the new page is sent to the analysis module 120.

If a determination is made at the decision state 620 that there are sites that reference the current site, the process 600 moves to a state 632 wherein the system points to the address of the first referenced site. The process 600 then returns to the state 610 in order to read the first page on the newly retrieved Internet site.

Figure 9:
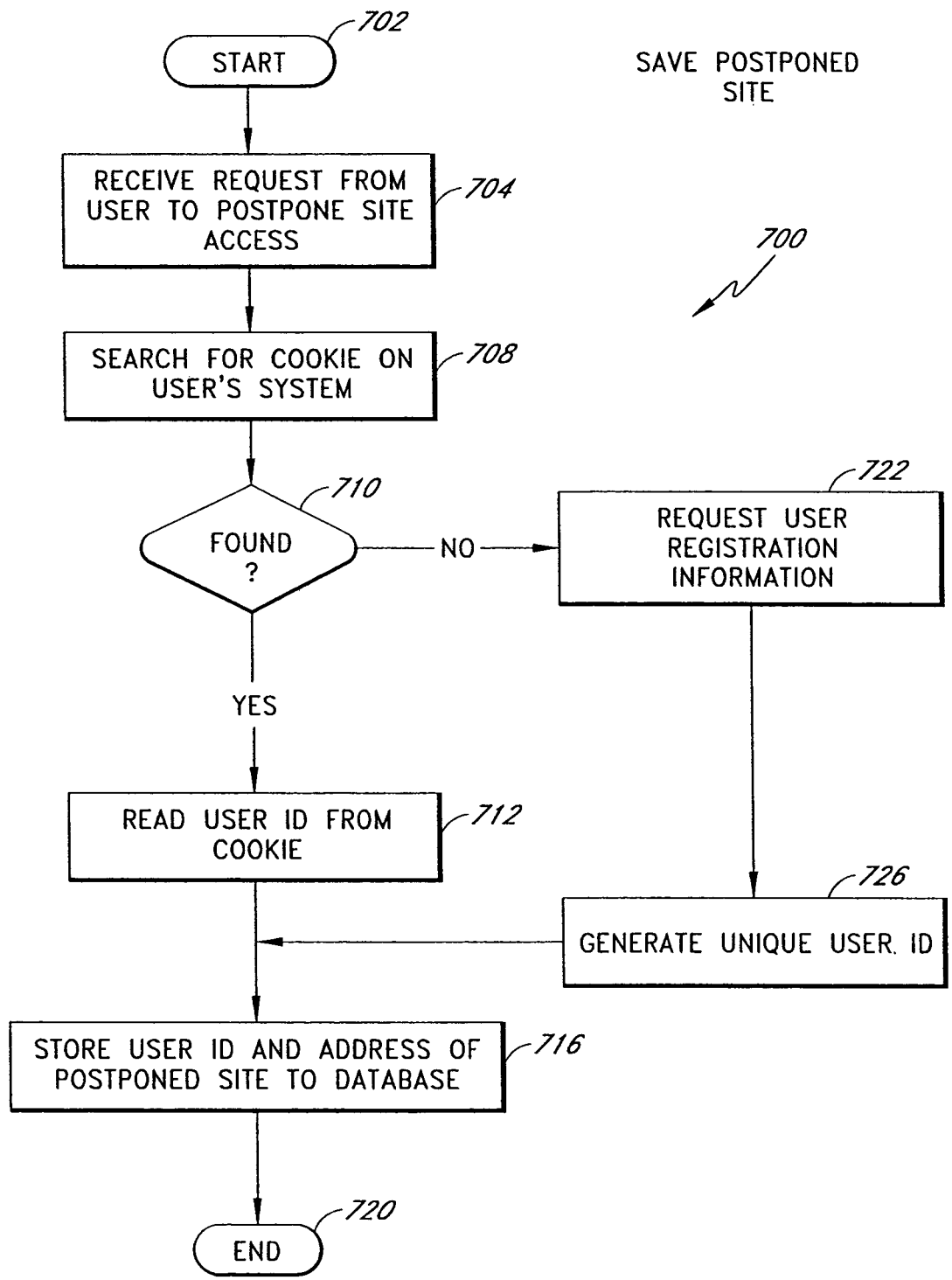
FIG. 9 is a flow diagram illustrating one embodiment of a process for saving a postponed Internet site to a database.

Referring now to FIG. 9, a process 700 for saving a postponed Internet site to the storage 280 is illustrated. The process 700 begins at a start state 702 and then moves to a state 704 wherein a request is received by the postponement module 250 from a user to postpone access to a particular site. It should be noted that this request is normally made when a user accesses a site that is within a category that has been designated as being blocked during the day. The site can, however, be accessed, for example, later in the evening through a login procedure.

Thus, when the user attempts access during the day, the postponement module 250 compares the request against the categorized database of sites to determine if the site is within a category that has been designated as being blocked during, for example, daytime hours. If the site is found to be within such a category, the system sends an inquiry to the user requesting whether he desires to postpone access to the site. If the user does request that the site access be postponed, the process 700 moves to a state 708 wherein the cookie analysis module 270 searches for a cookie on the user's system. Of course, it should be realized that the specific hours that the user is prevented access to the site can be programmed as necessary. For example, users might be prevented from accessing certain categories of Internet sites between 8:00 am and noon, but allowed full access after noon.

The process 700 then moves to a decision state 710 to determine whether a cookie bearing the user's unique identification number is found on the user's computer. If a cookie is found, the process 700 moves to a state 712 wherein the user's identification number is read from the cookie. The process 700 then moves to a state 716 wherein the user identification number and address of the postponed site is stored to the storage 280.

If a determination is made at the decision state 710 that no cookie was found on a user's system, the process 700 moves to a state 722 wherein user registration information is requested from the user. A unique user identification is then generated at a state 726, and the process 700 thereafter stores the user identification number and address of the postponed site to the storage 280. The process then terminates at an end state 720.

It should be realized that the storage preferably stores the actual pages from the requested site within the storage 280. Thus, the user is provided access to copies of the requested site after entering the postponement management system 44. Because the site is stored on the management system 44, access by the user can be controlled through access settings within the system 44. Therefore, the user does not need to attempt access to the original sight on the Internet, which might still be blocked by the system 10.

Figure 10:
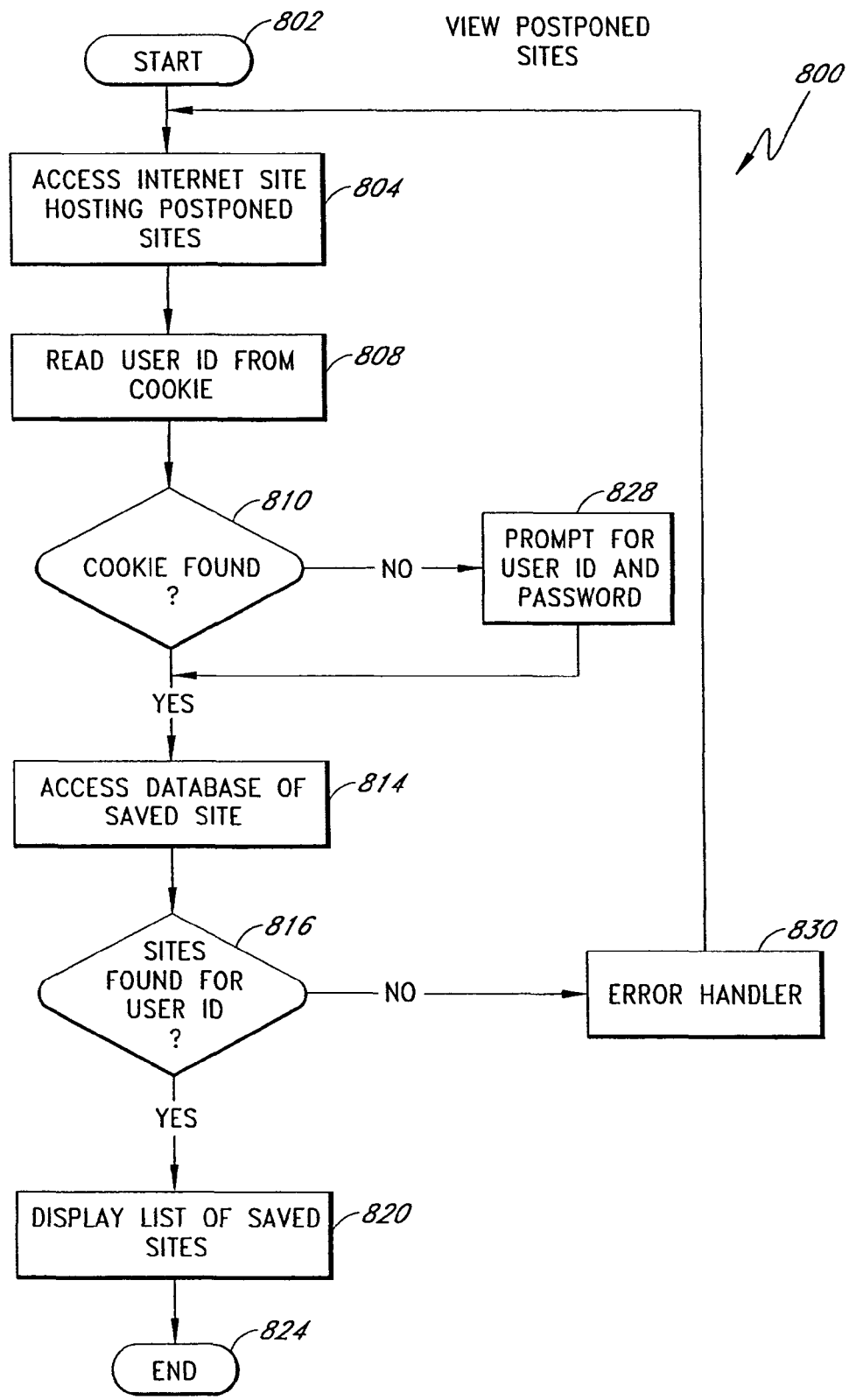
FIG. 10 is a flow diagram illustrating one embodiment of a process for viewing a site that was saved using the process of FIG. 9.

Referring now to FIG. 10, a process 800 of viewing postponed sites is illustrated. The process 800 begins at a start state 802 and then moves to a state 804 wherein a user accesses the postponement management system 44. The process 800 then moves to a state 808 wherein an attempt is made to read the user's identification number from a cookie stored on their system. A determination is then made at a decision state 810 whether a cookie was found on the user's system. If the appropriate cookie was found at the decision state 810, the user is provided with access to the database of stored sites within the storage 280. As discussed above, the stored sites are saved within the storage 280.

A determination is then made at a decision state 816 whether the appropriate sites were found for the requested user identification number. If the sites are found within the storage 280, the process 800 moves to a state 820 wherein a list of the saved sites for that user identification number is listed. The process 800 then terminates at an end state 824.

If a determination is made at the decision state 810 that no cookie is found on the user's system, the process 800 moves to a state 828 wherein the user is prompted to enter a user identification number and password in order to access their postponed sites.

If a determination is made at the decision state 816 that no sites were found for the user within the storage 280, an error-handling routine is run at a state 830 and the process returns to the state 804.

Referring now to FIG. 11, a timer quota process 850 is illustrated. The timer quota process 850 begins at a start state 852 and then moves to a state 854 wherein a request is received for an Internet page or site. A determination of the category of the page or site is then made at a state 858 by reference to the categorized database 30. The process 850 then moves to a state 860 wherein any timer quota parameters for the selected category of sites are retrieved. For example, a quota parameter indicating that users can only spend, for example, 30 minutes within the Sports category might be retrieved at the state 860.

The process 850 then moves to a state 862 wherein the total amount of time the user has spent viewing pages or sites within this category are retrieved from the storage 258. A determination is then made at a decision state 864 whether the time quota for this user exceeds the quota parameter retrieved at the state 860.

If a determination is made that the time quota has not been met, the page or site requested is retrieved at a state 866 and a timer is begun at a state 868. A determination is then made at a decision state 860 whether the user is continuing to access the requested site. If a determination is made that the user is continuing to access the requested site, the process 850 returns to the decision state 864 to determine whether the time quota has been met.

If a determination is made that the user is no longer accessing the requested site, the process 850 moves to a state 874. When the timer has ended, the process 850 then adds the elapsed time spent on the Internet site to the user's total time for the category.

If a determination is made at the decision state 864 that the timer quota was met, a notification is sent to the user of such a fact at the state 884, and the process terminates at the end state 880. It should be noted that if the time quota has been met, the process 850 skips the state 866 wherein the page or site requested is retrieved. Thus, once the time quota has been met, the user is barred from accessing the requested site. This provides a mechanism for restricting users to only accessing sites for a limited period of time.

It should be noted that each category provides its own time limitation so that spending time within one category does not affect the user" total quota time within a different category. Thus, the management of a business could set, for example, a 15-minute quota for sites within the Sports category, and a 1-hour time limit per day for sites within the Internet Commerce category.

Figure 12:
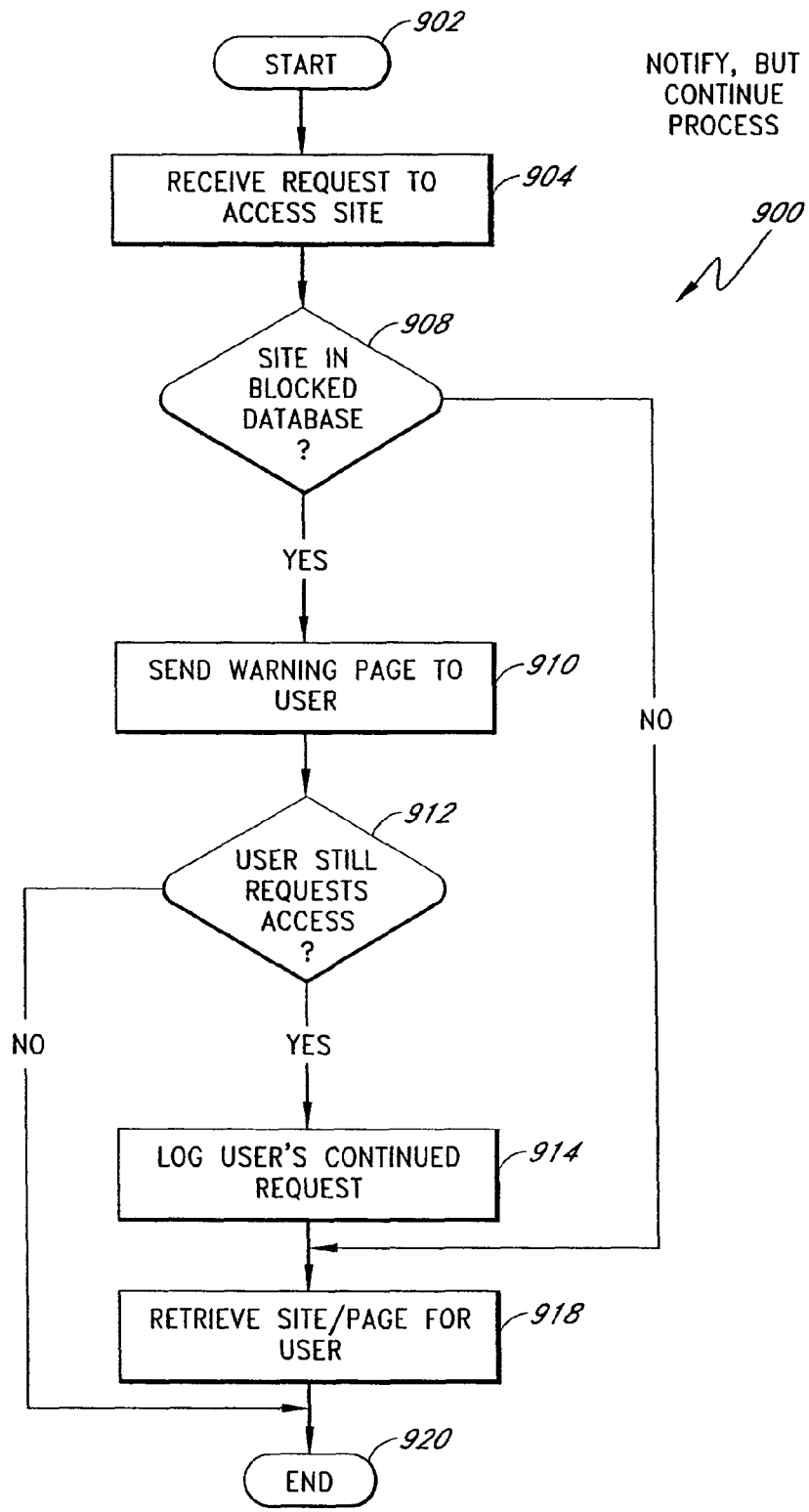
FIG. 12 is a flow diagram illustrating one embodiment of a process for notifying a user that they have requested a blocked Internet site, but allowing access upon request by the user.

Referring now to FIG. 12, a process 900 for notifying a user that their requested site is within a blocked category but allowing them to continue to access the site is explained. The process 900 begins at a start state 902 and then moves to a state 904 wherein the site management module 26 receives a request to access an Internet site. A determination is then made at a decision state 908 whether the requested site is within the categorized database 30. If a determination is made that the site is within the categorized database 30, the process 900 moves to a state 910 when a warning page is sent to the user. Within this warning page is a statement that the requested site has been blocked by management of the company, and that further access will be logged and forwarded to the user's supervisor.

The process 900 then moves to a decision state 912 to determine whether the user still requests access to the site, now that he has knowledge that his access will be tracked by a supervisor. If a determination is made that the user still requests access, the process 900 moves to a state 914 wherein the user's site request, user name, date and time is logged to a file. The site or page that was requested is then retrieved from the Internet at a state 918 and the process 900 terminates at an end state 920.

If a determination is made at the decision state 908 that the site is not within the categorized database 30, the process 900 skips directly to the state 918 wherein the requested site or page is retrieved for the user.

If a determination is made at the decision state 912 that the user does not request access to the blocked site after receiving the warning page at the state 910, the process 900 terminates at the end state 920 without retrieving the requested site.

Figure 13:
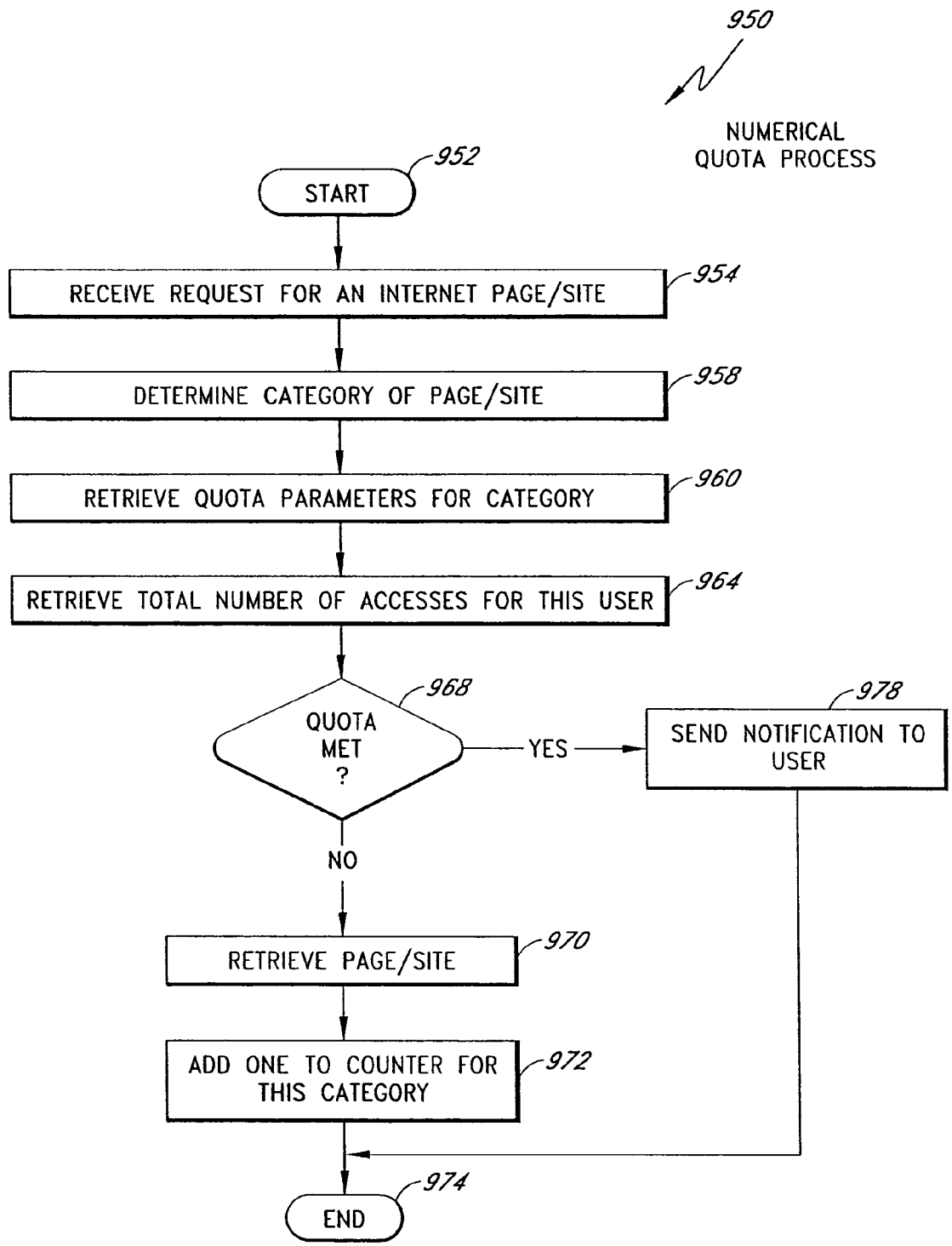
FIG. 13 is a flow diagram illustrating one embodiment of a process for counting the number of times a user has accessed a particular Internet site, and blocking access to that site once a predetermined limit has been reached.

Referring now to FIG. 13, a numerical quota process 950 running within the quota module 254 is illustrated. This process is used to track the number of times a user accesses a particular site on the Internet. Thus, the process 950 begins at a state 952 and then moves to a state 954 wherein a request for a particular Internet page is received from a user. The process 950 then moves to a state 958 wherein the category of the requested site is determined by reference to the categorized database 30.

The process 950 then retrieves quota parameters from the quota module 254 relating to the category of the requested site. Thus, if the user requests access to a site that has been determined to be within the Sports category, the quota parameters for the Sports category will be retrieved at the state 960. For example, a quota parameter might be that the user is allowed 10, 20, 30, 40, 50 or more accesses to a site within the chosen category in any 24-hour period.

The process 950 then moves to a state 964 wherein the total number of accesses to this category of Internet sites is retrieved from the storage 258. It should be noted that these values can be set to zero every day, week or month depending on the quota system implemented within the categorized site management module 26.

A determination is then made at a decision state 968 whether the user's quota has been met. If the user's quota was not met, the process 950 moves to a state 970 wherein the page or site is retrieved. The process 950 then adds one to a counter stored within the storage 258 at a state 972 and the process 950 terminates at an end state 974.

If a determination is made at the decision state 968 that the user's quota for the number of accesses to this category of sites has been exceeded, the process 950 moves to a state 978 wherein a notification is sent to the user that their quota maximum has been exceeded. The process 950 then terminates at the end state 974.

Example 1

Normalizing Training Data

As discussed above, the source pages of different web sites have different numbers of words on them. This can affect the word pair and word adjacency training process since Internet sites with fewer words on them can force higher relevancies on word pairs and word adjacencies than sites with fewer words. For instance, consider two pages, A and B, with 10 and 500 words pairs on their source pages respectively. Assuming each site has a current page score (Sc) of 0 and a target page score (St) of 1000. The current training algorithm takes the form of the following equation:

$$Wrn = Wrc + I \quad (E1)$$

where Wrn is the new word pair relevance and Wrc is the current word pair relevance and I is the amount that the each word pair relevance should be incremented such that if the page were immediately re-scored its score would equal the target score. I can be found by taking the current score, subtracting it from the target score and dividing it by the total number of word pairs (Wt) on the page. The equation is as follows:

$$I = [(St - Sc)/Wt] \quad (E2)$$

Finding the new word pair relevance requires adding the current relevance to the increment value. The new word pair relevance equation then becomes:

$$Wrn = Wrc + [(St - Sc)/Wt] \quad (E3)$$

Using the equation above to calculate the word pair relevances for sites A and B we find:

$$Wrn(A) = 0 + [(1000-0)/10] = 100 \text{ (note: } I = 100) \quad (E4)$$

$$Wrn(B) = 0 + [(1000-0)/500] = 2 \text{ (note: } I = 2) \quad (E5)$$

Interpreting these results, the 10 word pairs on site A would each have a relevance of 100 while the 500 word pairs on site B would each have a relevance of 2 to the chosen category after one round of training.

If these two sites were determined to be equally "qualified" to train a particular category, then logically they should influence word pairs from other pages to a similar degree. However, at this point, this is not the case. Instead, a site with 10 word pairs can influence the weight of words found up to as much as 5000% more than a site with 500 word pairs. Instead, a system that increments word pairs "evenly", regardless of the number of words that occur on the page is desired.

A method for normalizing the amount that each word pair is incremented is advantageous. Using the results from E4 and E5, the minimum and maximum amount that each word pair can be incremented is 100 and 2 respectively. Since, we want the minimum relevance score and the maximum relevance score to approach each other, we can take their average using the midpoint theorem:

Mp=(p1+p2)/2, where Mp is midpoint, p1 is point 1, and p2 is point 2

We find that the midpoint between the min and max increment is:

$$Mp = [I(A) + I(B)]/2 \quad (E6)$$

Using the values from E4 and E5, $$Mp = [100+2]/2 = 102/2 = 51 \quad (E7)$$

Thus, determining the "adjustment constants" that should be used to adjust the relevance scores towards the midpoint score for each site relies on the following two equations:

| (E8) | I(A) * AdjCon(A) = Mp | or | AdjCon(A) = Mp/I(A) |
| (E9) | I(B) * AdjCon(B) = Mp | or | AdjCon(B) = Mp/I(B) |

Substituting in, $$AdjCon(A) = 51/100 = 0.51 \quad (E10)$$

$$AdjCon(B) = 51/2 = 25.5 \quad (E11)$$

Therefore, with ten words, the increment should be multiplied by 0.51 to reach the midpoint value of 51. Similarly, with 500 words, the increment value needs to be multiplied by 25.5 to reach the midpoint value of 51. This logic can be used to formulate the training normalization constant, Nt. The equation for calculating Nt is:

$$Wt(X)*Nt = AdjCon(X) \text{ or } Nt = AdjCon(X)/Wt(X) \quad (E12)$$

With a min of 10 words (Wt(A)=10) and max of 500 words (Wt(B) 500), the training normalization constant is:

$$Nt = AdjCon(A)/Wt(A) = 0.51/10 = 0.051 \quad (E13)$$

$$Nt = AdjCon(B)/Wt(B) = 25.5/500 = 0.051 \quad (E14)$$

The training normalization constant with a range of words between 10 and 500 words is 0.051. The importance of this constant can now be illustrated. The total score, Sn, for the pages in our example after one round of training can be found using the equation:

$$Sn = Wt*Nt*(St-Sc)/Tp \quad (E15)$$

where Tp is the total number of possibilities of word combinations.

It should be noted that the total number of possibilities is dependent upon such things as groupings and the manner in which the words are cycled through. For example, if the page has 100 words, we can take groups of 10 words and cycle through them in increments of 5. Taking such things into account the equation for Tp becomes:

$$Tp = (Wt/Wi - 1)*(Wg)!/[(Wg-k)!(k)!]$$

Where k is the k-set: k=1 for single words, k=2 for word pairs, k=3 for word triplets, etc. Wg is word groupings, Wt is word total, and Wi is word increment (or cycling). In the examples in discussed below, Wt is equal to Tp. While this simplifies the examples provided herein, it is not necessarily the case when k>1.

In the special case where Wt=Tp, the amount that the relevance score for each word will be raised is:

$$Nt*(St-Sc) \text{ or } 0.051*(St-Sc) \quad (E16)$$

This is a simplified example, but illustrates the basic principles of normalizing word scores in the training process. Note that for k>1 (or anything other than single word counts), Wt is not equal to Tp.

It should also be appreciated that this normalization process can be used to not only train lexical elements to be associated with a particular sites (up-train), it can also be used to train lexical elements to not be associated with a particular site (down-train). During an up-training session, the word relevance scores of lexical elements on a page are increased within the designated category to indicate that they are more strongly associated with the category.

During a down-training session, the word relevance scores of lexical elements on a page are reduced to indicate that they are less strongly associated with a chosen category. Accordingly, it should be realized that to down train a page, the normalization constant would be calculated to move the score of each page downward to, for example, a score of 500. Thus, each lexical element on the page would be multiplied by a normalization constant that resulted in a lowered value for the page relevance score.

However, in either case, it is advantageous to normalize the amount that each word relevance score changes so that a page with fewer lexical elements does not more greatly affect the word relevancies found on that page.

Example 2

Normalizing Internet Page Scoring

If words, word pairs and word adjacencies are "trained up" by approximately the same value so that each has a gradually greater relevance score, then how does that affect the page scoring process. Assume two sites A and B, have 10 and 500 words on them respectively. Each has a score of 0 before one round of training and the target score is 1000. Since we are dealing with single words, k=1, then Wt=Tp. Using equation 16, we find that the amount each word will be incremented is:

$$0.051*(St-Sc)=0.51*(1000-0)=51 \quad (E17)$$

If each word was raised 51 points, then the score of each page after one round of training would be 51 times the number of words on that page. The score for each page is:

$$Score(A)=10*51=510 \quad (E18)$$

$$Score(B)=500*51=25500 \quad (E20)$$

Obviously, these scores are not close to each other. Judging solely upon the numbers, it would seem that site B was much more relevant to a category than site A. However, we used them both to train the same category. Consequently, they should have similar values after one round of training. We need a system that takes into account the skew that pages with varying numbers of words can create.

What we want to accomplish is to create some means of normalizing scores of pages based on the number of words that occur on them. Using equations 18 and 19, we can approximate the maximum and minimum scores for sites. Since we want the min and max to approach each, we can find their midpoint using the midpoint formula:

$$(510+25500)/2=13005 \quad (E20)$$

Finding the "adjustment variables" for this set of data requires dividing the midpoint score by the real score:

(E21)   Ns(A) = 13005/510 = 25.5   (note: Wt = 10)
(E22)   Ns(B) = 13005/25500 = .51  (note: Wt = 500)

We now know the points (10 words, 25.5) and (500 words, 0.51). If we find a few more points (255, 1), (132, 1.931818), and (378, 0.674603) and plot them, we get an ordered data set with a trendline that has the equation:

$$y=255*x^{-1} \quad (E23)$$

Substituting in the Ns(Wt) for y (which is the score normalizer, given a set number of words) and Wt (total words) for x. We get the equation:

$$Ns(Wt)=255*(Wt)^{-1} \quad (E24)$$

For our sites A and B with 10 and 500 words:

$$Ns(10)=255*(10)^{-1}=25.5 \quad (E25)$$

$$Ns(500)=255*(500)^{-1}=0.51 \quad (E26)$$

In general, the scoring equation becomes:

Normalized Score(Site X)=Ns(Wt(Site X))*Original Score(Site X) (E27)

Using the results from equations 18 and 19, the scores of site A and site B were 510 and 25,500, respectively. Using the normalized score technique, after one round of training the scores of these sites would be:

Normalized Score(A)=Ns(Wt(A))*Score(A)=
25.5*510=13005 (E28)

Normalized Score(B)=Ns(Wt(B))*Score(B)=
0.51*25500=13005 (E29)

The sites have the same score after training. This supports the logic that sites that are used to train a category should have similar scores. These equations, in combination with the normalization of training data, as shown in Example 1, minimizes the error caused by having sites with different numbers of words on them in a training set.

Example 3

Scoring a Page

Approximately 8000 samples were collected from sites from the Category Two (or Sex 2) of the Suggest Database. These potential category two sites had previously been checked by Web Analysts to determine whether they were, in fact, Internet sites that were primarily sexual or pornographic in nature. A score of 8 was assigned to a site that was verified as a sex site and a score of 7 to those sites that were determined not to be sex sites. The categorization system had assigned a category rating for category two to all 8000 Sites.

The purpose of the study was to determine whether the categorization system could distinguish between sites rated as 8's and 7's, or accepted sites and deleted sites, respectively. It should be noted that a deleted site is one that should not have been categorized within the Sex category and an accepted site is one that was confirmed to be within the category. The hypothesis was that the mean score for the sites rate as 8's would be statistically different from the mean score for sites rated as 7's. As suspected, the mean for the accepted sites (8's) were significantly higher than the mean for the deletions (7's). However, there was an overlap between the two groups. This result suggests that the use of a cutoff point could be used to minimize the error involved.

|  | Mean Score | Standard Deviation | Median |
|---|---|---|---|
| 7's (deletions) | 929 | 482 | 842 |

Alpha Point=Ap=$M_7$+4($SD_7$)=929+4(482)=2857

Beta Point=Bp=$M_7$+1($SD_7$)=929+1(482)=1411

Using an alpha point of 2857 we found a sorting accuracy of 99% or above. There were only 9 sites that were above the alpha score, but did not belong within the Sex category. Seven of them were simple errors, perhaps attributable to poor training of the Category 2 sites.

Two of them were purposeful tricks, meaning that the Internet sites used sex-related terms to attract attention in their metatags. The exact percentage for the sorting accuracy, using the alpha point of 2857, was therefore 99.30%. Thus, according to this test, if a thousand sites were entered with a score above this alpha point there will be, on average, only 7 mistakes and 993 correctly sorted sites.

However, because the alpha point is set very high, many sites that are, in fact, sexually oriented, will not be categorized at all. Using an alpha point of 2857, the inclusion level of accepted sites is only 49.80%. This means that out of a thousand sites that should be placed in category two, 498 would be found and 502 missed.

For this reason, the system also monitors sites that have a lower relevance to each category through creation of a beta point. Using a beta point of 1411, the inclusion level rises from 49.80% to 81.76%. The number of sites missed falls from 502 to 183 sites, and the number caught rises from 498 to 817. Thus, the use of both the alpha and beta points results in more accurate scoring of any new site.

Example 4

Normalizing Training Data by Increments

Another embodiment of a method for normalizing training data is explained below. First, we define Is=initial score and Ts=target score for the page being trained.
1) Begin with a test increment value of, for example, 1. Increment the values of the relevance of all lexical values by the test value. (e.g.: all lexical values existing on the page).
2) Calculate the resulting page relevance score after this test addition.
3) If the new score=Ms., the increment value, I, (for all lexical elements)=

$I=(Ts-Is)/(Ms-Is)$

Thus, the difference between the target score and the current score, divided by the effect on the score when each elements relevance is incremented by 1 is the correct number to Increment each element to achieve the target score.

Accordingly, if the Is=500, and Ts=1000 incrementing all relevancies by 1 will result in a page score of 550 and:

$I=(1000-500)/(550-500).$

Therefore, to increment the page to result in a page score of 1000, we need to use an increment value is 10 for each lexical element.

In general the relevance for a value will be incremented by the Increment constant (I)*the # of occurrences of that element on the page. This follows from the notion that the more often an element appears on a page the more relevant it is. However, this process resulted in large fluctuations in the relevance of elements that would occur frequently, but were not common words. For this reason, in one embodiment, each value was only allowed to increment by a maximum 5* increment constant (I).

What is claimed is:

1. A method of controlling user access to Internet sites between a local area network and an Internet, comprising:
determining within a central device of a local area network a content category of each Internet site that a user is accessing, said Internet site being previously associated with said content category based upon a comparison between a total page relevancy score and an alpha score, the total page relevancy score being defined at least in part by a relevancy score for a word pair from said Internet site to said content category;
providing a timer; and
blocking said user from accessing Internet sites in said content category when said timer reaches a predetermined level.

2. The method of claim 1, wherein said predetermined level is thirty minutes.

3. The method of claim 1, wherein said predetermined level is one hour.

4. The method of claim 1, further comprising periodically resetting said timer.

5. The method of claim 4, wherein said timer is reset every 24 hours.

6. The method of claim 1, further comprising:
determining a second content category of an Internet site that said user is accessing;
establishing a second timer;
incrementing said second timer with time spent accessing said second content category by said user; and
blocking said user from accessing Internet sites in said second content category when said second timer reaches a second predetermined level.

7. The method of claim 1, further comprising allowing said user to bypass said blocking, wherein said access is reported to a network administrator.

8. The method of claim 1, further comprising caching Internet sites in said content category that are requested by said user after said timer reaches said predetermined level, wherein said user may access said cached Internet sites after a predetermined time.

9. The method of claim 1, wherein the central device is an internet gateway system.

10. A system for rating Internet sites between a local area network and an Internet comprising:
a central device of a local area network comprising a processor and a memory;
the memory including:
instructions that when executed by the processor of the central device determines a content category of each Internet site that a user is accessing, said Internet site being previously associated with said content category based upon a comparison between a total page relevancy score and an alpha score, the total page relevancy score being defined at least in part by a relevancy score for a word pair from said Internet site to said content category;
instructions that when executed by the processor of the central device provides a timer; and
instructions that when executed by the processor of the central device blocks said user from accessing Internet sites in said content category after said timer reaches a predetermined level.

11. The system of claim 10, the memory further comprising instructions that when executed by the processor of the central device caches any Internet sites requested by said user after said timer reaches said predetermined level, wherein said user may access said cached Internet sites after a predetermined time.

12. The system of claim 10, wherein the central device is an internet gateway system.

* * * * *